United States Patent
Senshu et al.

(10) Patent No.: US 7,502,294 B2
(45) Date of Patent: Mar. 10, 2009

(54) INFORMATION RECORDING AND PLAYBACK APPARATUS, CONTENT MANAGEMENT METHOD, AND CONTENT MANAGEMENT PROGRAM CAPABLE OF PREVENTING ILLEGAL COPYING OF CONTENT

(75) Inventors: Susumu Senshu, Kanagawa (JP); Shigeharu Sato, Chiba (JP)

(73) Assignee: Sony Corporation, Tokyo (JP)

( * ) Notice: Subject to any disclaimer, the term of this patent is extended or adjusted under 35 U.S.C. 154(b) by 862 days.

(21) Appl. No.: 11/090,342

(22) Filed: Mar. 24, 2005

(65) Prior Publication Data
US 2005/0213234 A1 Sep. 29, 2005

(30) Foreign Application Priority Data
Mar. 24, 2004 (JP) ............................ P2004-085987

(51) Int. Cl.
*G11B 11/00* (2006.01)
(52) U.S. Cl. ...................... 369/53.12; 369/84
(58) Field of Classification Search ........................ None
See application file for complete search history.

(56) References Cited
U.S. PATENT DOCUMENTS
6,556,679 B1 * 4/2003 Kato et al. .................. 380/203
7,159,089 B2 * 1/2007 Kori et al. .................... 711/163
2003/0185128 A1 * 10/2003 Shoji et al. ................ 369/59.25
2007/0171801 A1 * 7/2007 Kobayashi et al. ........ 369/59.11

FOREIGN PATENT DOCUMENTS
| JP | 2002244926 | 8/2002 |
| JP | 2002-297452 | 10/2002 |
| JP | 2003-228522 | 8/2003 |

* cited by examiner

*Primary Examiner*—Paul Huber
(74) *Attorney, Agent, or Firm*—Bell, Boyd & Lloyd LLP

(57) ABSTRACT

Information recording and playback apparatus, content management method, and content management program. When data of copyright-protected content is recorded in a general-purpose HDD, illegal copying of the content is prevented. Each time when content is recorded in the HDD and when content recorded in the HDD is moved to a Blu-ray disc (BD), a random number output section outputs unique verification information (a random number) and overwrites the unique verification information in the corresponding verification files of the HDD and an EEPROM. Then, when the content recorded in the HDD is to be moved to the BD, a verification section verifies the verification information (random number) recorded in the verification file of the HDD against the verification information (the random number) recorded in the verification file of the EEPROM, and permits the movement of the associated content only when they match.

15 Claims, 11 Drawing Sheets

INFORMATION RECORDING AND PLAYBACK APPARATUS, CONTENT MANAGEMENT METHOD, AND CONTENT MANAGEMENT PROGRAM CAPABLE OF PREVENTING ILLEGAL COPYING OF CONTENT

CROSS REFERENCE TO RELATED APPLICATIONS

The present application claims priority to Japanese Patent Document No. P2004-085987 filed on Mar. 24, 2004, the disclosure of which is herein incorporated by reference.

BACKGROUND OF THE INVENTION

The present invention relates to an information recording and playback apparatus capable of recording information on a number of recording media and playing back recorded information, a content management method for use with the information recording and playback apparatus, and a content management program for use therewith.

In recent years, video recorders having two kinds of recording media, such as an HDD (Hard Disk Drive) and a writable optical disc such as a DVD (Digital Versatile Disc), have become popular. In such video recorders, different uses are made in such a manner that, for example, video content for the purpose of time shift viewing is recorded in an HDD, and video content for the purpose of a long period of storage is recorded on an optical disc.

Furthermore, recently, as an optical disc capable of recording a larger amount of data, a Blu-ray disc (hereinafter abbreviated as a "BD") has been developed. The use of BDs makes it possible to record digital data of an HDTV (High Definition TeleVision) video provided by, for example, a digital broadcast which can be recorded for approximately two hours on one side of a BD.

As high-quality digital content can be easily stored in a portable recording medium in the manner described above, the importance of copyright protection of digital content has increased. In the video content at present, a method for attaching copy control information (CCI) indicating the permission/non-permission of copying to the data of content is generally used. For example, by using the copy control information, the data of each piece of video content can be made to be a state in which copying is not limited (copy free), a state in which copying is permitted only once (copy once), and a state in which copying is prohibited (copy never).

Among them, the video content that is recorded on a recording medium as a result of being set as copy once is permitted to be recorded on another recording medium under the condition that the data of that recording medium is erased (or invalidated). As described above, the operation of erasing the original data and copying it on another recording medium is called "move". For example, when a user thinks that video content recorded in an HDD of the video recorder should be stored for a long period of time, the video content can be moved to a portable recording medium such as a DVD. Thus, both the convenience for the user and the prevention of illegal copying in a large amount can be managed.

As a conventional technology for enabling "move", there is an invalidation apparatus including a sequential invalidation section for sequentially invalidating partial data that is determined to be invalidated among the target data recorded on a recording medium in order to invalidate the original data during a movement (see, for example, 2002-244926, paragraphs [0024]-[0037], FIG. 2).

FIG. 10 is a block diagram showing an example of functions for controlling copying in a conventional video recorder having two recording media.

In a conventional video recorder 3 shown in FIG. 10, video content can be recorded in an HDD 24 and a BD 25a loaded into a BD drive (BDD) 25. Furthermore, in order to control a copying operation on these recording media, the video recorder 3 includes encryption processing sections 131 and 132, a content movement control section 200, and an EEPROM (Electronically Erasable and Programmable Read Only Memory) 22.

The encryption processing sections 131 and 132 encrypt data of video content (hereinafter abbreviated as "content data") input from a tuner for a television broadcast and an external input terminal and output the data to the HDD 24 and the BDD 25, respectively. Also, the encryption processing sections 131 and 132 decrypt the content data read from the HDD 24 and the content data read from the BD 25a through the BDD 25, respectively, and output the data.

As one piece of information used for the above encryption and decryption, a set ID that is uniquely assigned to each video recorder is recorded in the EEPROM 22 in such a manner that it cannot be rewritten. Also, in an area called a burst cutting area (BCA) in the BD 25a, a disc ID that is uniquely assigned to each BD 25a is recorded in such a manner that it cannot be rewritten.

When the content data is moved from the HDD 24 to the BD 25a, the content movement control section 200 controls that operation in accordance with copy control information attached to the data.

In the video recorder 3, when content data that is input from a tuner or externally is to be recorded in the HDD 24, the encryption processing section 131 encrypts this content data using a key based on the set ID read from the EEPROM and outputs the data to the HDD 24 only when the copy control information attached to the input content data is "copy once". Also, in the video recorder in which copying from the HDD 24 to the BD 25a is possible, the encryption processing section 131 usually changes the copy control information to "movable" indicating that "move" is permitted, further encrypts this copy control information, and supplies the information to the HDD 24. The HDD 24 stores therein the encrypted content data and the encrypted copy control information.

As described above, as a result of encrypting content data using the set ID and recording it in the HDD 24, it is possible to prevent the content data from being played back illegally with the content data recorded in the HDD 24 being copied as is on another recording medium in bit units (called "bit-by-bit copy") or with the HDD 24 itself being loaded into another video recorder.

Furthermore, content data that is input from a tuner or externally may also be recorded directly in the BD 25a. In this case, only when the copy control information attached to the content data is "copy once", the encryption processing section 132 encrypts the content data using a key based on the disc ID read from the BD 25a by the BDD 25, and outputs the data to the BDD 25. At this time, the copy control information is changed to "copy never", the information is further encrypted, and the information is supplied to the BDD 25. The BDD 25 records the encrypted content data and the encrypted copy control information in the data area of the BD 25a.

As described above, as a result of encrypting the content data using the disc ID and recording it on the BD 25a, it is possible to prevent the content data recorded in the BD 25a from being copied bit-by-bit and illegally played back.

In FIG. 10, encryption information such that, for example, information "A" is encrypted by the encryption processing sections 131 and 132 is indicated as "e1[A]" and "e2[A]", respectively.

When the copy control information given to the content data input from a tuner or externally is "copy never", none of the encryption processing sections 131 and 132 outputs the content data to the HDD 24 and the BDD 25. Also, when the copy control information is "copy free", encryption of the content data and the copy control information needs not to be performed, and the copy control information to be notified to the HDD 24 and the BDD 25 may be kept as is as "copy free".

The processing when the content data recorded in the HDD 24 is moved to the BD 25a is as follows. In FIG. 10, the flow of a signal in this case is indicated by a thick dotted-line arrow.

When the encryption processing section 131 receives the content data and the copy control information read from the HDD 24 and confirms that the copy control information is "movable", the encryption processing section 131 decrypts the content data and the copy control information by using the key based on the set ID read from the EEPROM 22 and outputs the data to the content movement control section 200. The copy control information is also supplied to the content movement control section 200.

When the content movement control section 200 confirms that the input copy control information is "movable", the content movement control section 200 outputs the content data from the encryption processing section 131 to the encryption processing section 132. Along with this output, the content movement control section 200 causes the associated content data stored in the HDD 24 to be erased.

When the encryption processing section 132 confirms that the input copy control information is "movable", the encryption processing section 132 encrypts the input content data by using the key based on the disc ID read by the BDD 25, further encrypts the copy control information as "copy never", and outputs them to the BDD 25, whereby they are recorded on the BD 25a. As a result, "move" is performed among the different recording media, and the convenience for a user can be increased while protecting the copyright of the content data.

As an HDD installed in the video recorder, it is considered that a product having a general-purpose interface is used. In this case, the HDD in the video recorder can be taken out and relocated to, for example, a personal computer (PC), whereby the HDD is used. For this reason, if the content data encrypted in the manner described above is copied bit-by-bit in a PC environment, an illegal copy product can be produced.

FIG. 11 illustrates, by way of example, illegal copying when an HDD can be relocated to an external PC and can be used.

In FIG. 11, content data encrypted by the above-described method is recorded in the HDD 24 installed in the video recorder 3 (step S1), and this HDD 24 is taken out and is relocated to an external PC 4 (step S2). It is assumed that, for example, another HDD 4a is installed in the PC 4, and in this PC 4, all the data recorded in the HDD 24 is copied bit-by-bit in the HDD 4a (step S3). Thereafter, when the HDD 24 is taken out from the PC 4 and is relocated to the video recorder 3 (step S4), the content data can be moved from the HDD 24 to a BD 25a-1 loaded into the video recorder 3 (step S5).

Next, the HDD 24 in which the content data is erased by "move" is relocated again to the PC 4 (step S6), and the data copied in the HDD 4a in step S3 is copied bit-by-bit to the HDD 24 (step S7). Then, after the HDD 24 is returned again to the video recorder 3 (step S8), by repeating steps S5 to S8, the content data can be recorded on still other BDs 25a-2, 25a-3, . . . .

As described above, in the conventional copyright protection method, there is a problem in that, when the HDD is taken out, the content data is copied bit-by-bit in an external device, and the copied content data is relocated again to the original HDD, illegal copying on a plurality of recording media becomes possible even with content data in which only one copying is permitted.

SUMMARY OF THE INVENTION

The present invention has been made in view of such points. The present invention in an embodiment provide an information recording and playback apparatus capable of preventing illegal copying of content when data of copyright-protected content is recorded in a general-purpose HDD.

In another embodiment, the present invention provides a content management method capable of preventing illegal copying of content when data of copyright-protected content is recorded in a general-purpose HDD.

The present invention provides in an embodiment a content management program capable of preventing illegal copying of content when data of copyright-protected content is recorded in a general-purpose HDD.

In an embodiment, the present invention provides an information recording and playback apparatus capable of recording information on a plurality of recording media and playing back recorded information, the information recording and playback apparatus including: verification information output means for outputting verification information associated with all the information recorded on a first recording medium at least each time content is recorded on the first recording medium and content recorded on the first recording medium is moved to a second recording medium; non-volatile information holding means for holding most recent verification information output by the verification information output means; and verification means for verifying information recorded on the first recording medium against the verification information held by the information holding means at least when content recorded on the first recording medium is moved to the second recording medium and for permitting the movement of the content when the correlation of the information is correctly authenticated.

In the above-described information recording and playback apparatus, when content is recorded on the first recording medium, the verification information recording means may record unique verification information on the first recording medium and the information holding means. Here, if the first recording medium is taken out and relocated to an external device, the first recording medium is relocated again to the information recording and playback apparatus after the recording information is copied bit-by-bit, and the content recorded on the first recording medium is moved to the second recording medium, the verification means may verify the verification information of the first recording medium against the verification information of the information holding means. They are correctly authenticated, and the content is moved. Along with this movement, the verification information recording means may overwrite different verification information on the first recording medium and the information holding means.

Thereafter, if the first recording medium is taken out again and is relocated to the external device, the recording information that was recorded previously in the external device is relocated by bit-by-bit copy to the first recording medium, and the first recording medium is relocated to the information recording and playback apparatus, the verification information recorded on the first recording medium differs from the verification information held by the information holding means. For this reason, the movement of the content from the first recording medium to the second recording medium is rejected by the processing of the verification means, and illegal copying of the content in which only one movement is permitted is prevented.

In another embodiment, the present invention provides an information recording and playback apparatus capable of recording information on a plurality of recording media and playing back recorded information, the information recording and playback apparatus including: verification information output means for outputting verification information associated with all the information recorded on a first recording medium at least each time content is recorded on the first recording medium and content recorded on the first recording medium is moved to a second recording medium; non-volatile information holding means for holding most recent verification information output by the verification information output means; and verification means for verifying information recorded on the first recording medium against the verification information held by the information holding means at least when content recorded on the first recording medium is moved to the second recording medium and for permitting the movement of the content when the correlation of the information is correctly authenticated.

In the above-described information recording and playback apparatus, when content is recorded on the first recording medium, the verification information recording means may record, in the information holding means, the verification information associated with all the information recorded on the first recording medium. Here, if the first recording medium is taken out and is relocated to an external device, the first recording medium is relocated to the information recording and playback apparatus after the recording information is copied bit-by-bit, and the content recorded on the first recording medium is moved to the second recording medium, the verification means may verify the information recorded on the first recording medium against the verification information held by the information holding means. They are correctly authenticated, and the content is moved. Along with this movement, the verification information recording means may overwrite different verification information in the information holding means.

Thereafter, if the first recording medium is taken out again and is relocated to the external device, the recording information that was recorded previously in the external device is relocated by bit-by-bit copy to the first recording medium, and the first recording medium is relocated again to the information recording and playback apparatus, the correlation between all the information recorded on the first recording medium and the verification information held by the information holding means is not correctly authenticated by the processing of the verification means, and the movement of the content from the first recording medium to the second recording medium is rejected. Thus, illegal copying of the content in which only one movement is permitted is prevented.

In another aspect, the present invention provides a content management method for use with an information recording and playback apparatus capable of recording information on a plurality of recording media and playing back recorded information, the content management method including the steps of: outputting unique verification information and overwriting the unique verification information on a first recording medium and non-volatile information holding means at least each time content is recorded on the first recording medium and content recorded on the first recording medium is moved to a second recording medium; and verifying the verification information recorded on the first recording medium against the verification information held by the information holding means at least when content recorded on the first recording medium is moved to the second recording medium and permitting the movement of the content when the pieces of the verification information match.

In the above-described content management method, when content is recorded on the first recording medium, the verification information recording means may record unique verification information on the first recording medium and the information holding means. Here, if the first recording medium is taken out and is relocated to an external device, the first recording medium is relocated to the information recording and playback apparatus after the recording information is copied bit-by-bit, and the content recorded on the first recording medium is moved to the second recording medium, the verification means may verify the verification information of the first recording medium against the verification information of the information holding means. They are correctly authenticated, and the content is moved. Along with this movement, the verification information recording means overwrites different verification information on the first recording medium and the information holding means.

Thereafter, if the first recording medium is taken out again and is relocated to the external device, the recording information that was recorded previously in the external device is relocated by bit-by-bit copy to the first recording medium, and the first recording medium is relocated to the information recording and playback apparatus, the verification information recorded on the first recording medium differs from the verification information held by the information holding means. For this reason, the movement of the content from the first recording medium to the second recording medium is rejected by the processing of the verification means, and illegal copying of the content in which only one movement is permitted is prevented.

In another aspect, the present invention provides a content management method for use with an information recording and playback apparatus capable of recording information on a plurality of recording media and playing back recorded information, the content management method including the steps of: outputting verification information associated with all the information recorded on a first recording medium and overwriting the verification information on non-volatile information holding means at least each time content is recorded on the first recording medium and content recorded on the first recording medium is moved to a second recording medium; and verifying the information recorded on the first recording medium against the verification information held by the information holding means at least when content recorded on the first recording medium is moved to the second recording medium and permitting the movement of the content when the correlation of the information is correctly authenticated.

In the above-described content management method, when content is recorded on the first recording medium, the verification information recording means may record, in the information holding means, the verification information associated with all the information recorded on the first recording medium. Here, if the first recording medium is taken out and is relocated to an external device, the first recording medium is relocated to the information recording and playback apparatus after the recording information is copied bit-by-bit, and the content recorded on the first recording medium is moved to the second recording medium, the verification means may verify the information recorded on the first recording medium against the verification information held by the information holding means. They are correctly authenticated, and the content is moved. Along with this movement, the verification information recording means overwrites different verification information in the information holding means.

Thereafter, if the first recording medium is taken out again and is relocated to the external device, the recording information that was recorded previously in the external device is relocated by bit-by-bit copy to the first recording medium, and the first recording medium is relocated to the information recording and playback apparatus, the correlation between all the information recorded on the first recording medium and the verification information held by the information holding means is not correctly authenticated by the processing of the verification means, and the movement of the content from the first recording medium to the second recording medium is rejected. Thus, illegal copying of the content in which only one movement is permitted is prevented.

According to the present invention, even when a first recording medium is taken out and relocated to an external device and the recording information can be copied bit-by-bit, if content in which only one recording is permitted is recorded on the first recording medium, only one movement from the first recording medium to the second recording medium is permitted with respect to the associated content. Thus, it is possible to prevent a situation in which the associated content is illegally mass copied, and it is possible to reduce the manufacturing cost by using, for example, a fixed recording medium having high versatility as the first recording medium.

Additional features and advantages of the present invention are described in, and will be apparent from, the following Detailed Description of the Invention and the figures.

BRIEF DESCRIPTION OF THE FIGURES

FIGS. 9A and 9B are flowcharts showing the processing flow of the video recorder when the power supply is switched off and switched on in a case where verification information is verified when the power supply is switched on;

DETAILED DESCRIPTION OF THE INVENTION

Embodiments of the present invention will now be described below in detail with reference to the drawings. In the following description, it is assumed that the present invention is applied to a video recorder capable of recording and playing back video content.

Figure 1:
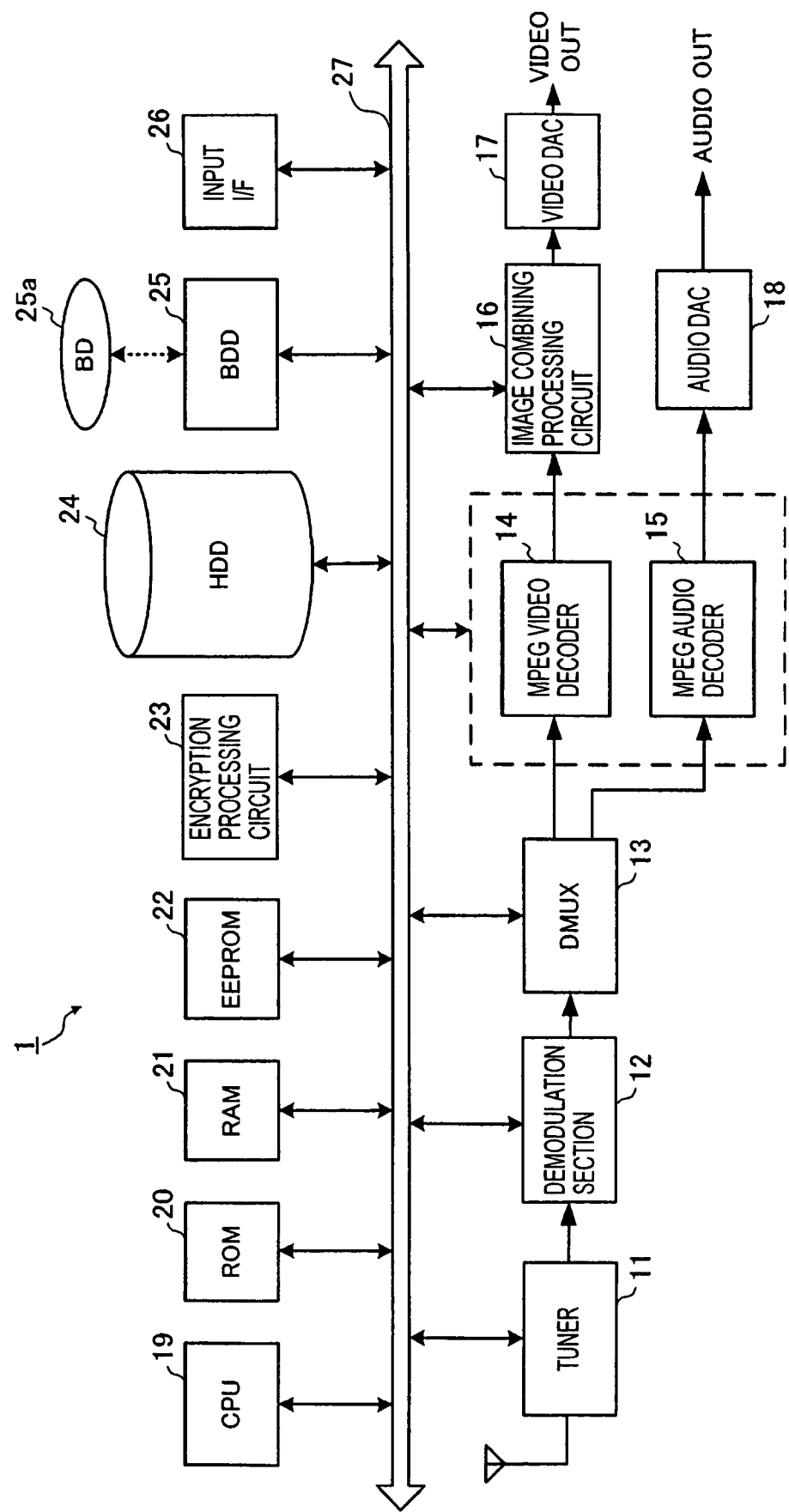
FIG. 1 is a block diagram showing the hardware configuration of a video recorder according to an embodiment of the present invention.

FIG. 1 is a block diagram showing the hardware configuration of a video recorder according to an embodiment of the present invention.

In FIG. 1, the configuration of a video recorder 1 capable of receiving and recording a digital broadcast is shown as an example. The video recorder 1 includes a tuner 11, a demodulation section 12, a DMUX (demultiplexer) 13, an MPEG (Moving Picture Experts Group) video decoder 14, an MPEG audio decoder 15, an image combining processing circuit 16, a video DAC (Digital Analog Converter) 17, an audio DAC 18, a CPU (Central Processing Unit) 19, a ROM (Read Only Memory) 20, a RAM (Random Access Memory) 21, an EEPROM 22, an encryption processing circuit 23, an HDD 24, a BDD 25, and an input interface (I/F) 26. In the video recorder 1, the CPU 19 is connected to each component in the apparatus via an internal bus 27 so as to centrally control the components. In the BDD 25, a BD 25a is loaded as an optical disc medium.

Upon receiving an input of broadcast waves received by an external antenna, the tuner 11 selects a signal of a predetermined carrier frequency in accordance with instructions from the CPU 19 and outputs the selected received signal to the demodulation section 12. The broadcast waves may be, for example, terrestrial waves or satellite waves relayed by a broadcasting satellite (BS) or a communications satellite (CS). A broadcast signal may also be received through a wire cable.

The demodulation section 12 performs QPSK (Quadrature Phase Shift Keying) demodulation and an error correction process on the broadcast signal from the tuner 11 and outputs a transport stream to the DMUX 13. When a scrambled broadcast signal is received, contract information of program viewing is extracted from the received signal from the tuner 11 and is transferred to the CPU 19, and a descrambling process is performed on the data in the transport stream, which is determined to be capable of being viewed under the control of the CPU 19 by using the key information supplied from the CPU 19.

The DMUX 13 demultiplexes moving-image data, audio data, additional information for a data broadcast, such as EPG (Electronic Program Guide), copy control information, etc., from the transport stream supplied from the demodulation section 12. In this embodiment, the moving-image data and the audio data are supplied as a moving-image stream and an audio stream, which are coded by the MPEG system, are demultiplexed by the DMUX 13, and are supplied to the MPEG video decoder 14 and the MPEG audio decoder 15, respectively. It is also possible for the DMUX 13 to supply the demultiplexed moving-image stream and the demultiplexed audio stream to the HDD 24 and the BDD 25 via the internal bus 27. Furthermore, the additional information for a data broadcast and the copy control information are supplied to the CPU 19 through the internal bus 27.

The MPEG video decoder 14 performs an expansion decoding process on the moving-image data supplied from the DMUX 13 or through the internal bus 27 in accordance with the MPEG-2 system and outputs the processed moving-image data to the image combining processing circuit 16. The MPEG audio decoder 15 performs an expansion decoding process on the audio data supplied from the DMUX 13 or through the internal bus 27 in accordance with the MPEG-Audio-Layer 2 system and outputs the processed audio data to the audio DAC 18.

The image combining processing circuit 16 combines as necessary OSD (On Screen Display) image data, such as a GUI image generated by the processing of the CPU 19, with the moving-image data decoded by the MPEG video decoder 14, and outputs the combined data to the video DAC 17. The video DAC 17 converts the image data generated by the image combining processing circuit 16 into an analog image signal and outputs it to an external television receiver, etc. The audio DAC 18 converts the audio data decoded by the MPEG audio decoder 15 into an analog audio signal and outputs it to an external television receiver, etc.

The CPU 19 centrally controls each section in the video recorder 1 by executing a program stored in the ROM 20, etc. In the ROM 20, the OS (operating system), BIOS (Basic Input/Output System), application programs, and various other kinds of data are prestored. The RAM 21 temporarily stores at least portions of the program to be executed by the CPU 19 and various kinds of data required for processing by this program.

In the EEPROM 22, a program to be executed by the CPU 19 and data required for processing are recorded in advance. In this embodiment, in particular, the set ID that is uniquely assigned to each video recorder is recorded in advance in such a manner that it cannot be rewritten, and this information is used when data of video content (content data) is encrypted and decrypted. Furthermore, as will be described later, this information is used when a verification file to be updated when the content data is recorded in the HDD 24 and a movement is performed is recorded, and the content data is recorded, moved, etc.

The HDD 24 is a storage device having a comparatively large capacity of, for example, 100 GBytes, which is capable of recording moving-image data for a long period of time. The HDD 24 performs the operation of writing and reading data in accordance with a command and address information specified by the CPU 19. In the HDD 24, content data made up of a moving-image stream and an audio stream, additional information for a data broadcast, etc., are recorded. Furthermore, in the HDD 24, a program to be executed by the CPU 19 and data required for the execution may also be stored.

The BDD 25 includes a drive device by which reading and writing of data are performed with the BD 25a being loaded as a portable optical disc medium, a driving circuit, etc. In the BD 25a, the data of broadcast content received by the video recorder 1 or other devices, etc., is recorded. The BDD 25 may be such that recording and playback can also be performed into and from another optical disc medium such as a DVD.

The input I/F 26 includes, for example, a receiving circuit for receiving an infrared signal from a remote controller (not shown), operation keys to be operated by the user, etc. The input I/F 26 supplies a control signal in accordance with the input operation by the user to the CPU 19.

The basic operation in the video recorder 1 will now be described below.

When a user views broadcast content for a digital broadcast, the CPU 19 outputs station selection information to the tuner 11 on the basis of a control signal from the input I/F 26. The tuner 11 selects the receiving signal of the carrier frequency in accordance with the input station selection information and outputs it to the demodulation section 12. In the demodulation section 12, QPSK demodulation and an error correction process are performed on the broadcast signal from the tuner 11, and in the DMUX 13, a moving-image stream, an audio stream, additional information for a data broadcast, etc., are demultiplexed from the processed transport stream.

The demultiplexed moving-image stream and audio stream are subjected to an expansion decoding process by the MPEG video decoder 14 and the MPEG audio decoder 15, respectively. The decoded moving-image data is supplied to the video DAC 17 via the image combining processing circuit 16, and the decoded audio data is supplied to the audio DAC 18. As a result, the station-selected broadcast content is played back and output in an external television receiver (not shown), etc.

When a scrambled broadcast signal is to be received, the broadcast signal from the tuner 11 is demodulated by the demodulation section 12 and thereafter a descrambling process is performed thereon. At this time, contract information of the program, key information for a descrambling process, etc., are written in a memory card (not shown), which is, for example, a portable semiconductor memory. The CPU 19 reads the contract information from the memory card, and also, the demodulation section 12 extracts the contract information from the received broadcast signal and supplies it to the CPU 19. The CPU 19 verifies these pieces of contract information, reads the key information from the memory card when it is determined that viewing is possible, and supplies the key information to the demodulation section 12. The demodulation section 12 performs a descrambling process by using the supplied key information.

The additional information for a data broadcast, which is demultiplexed by the DMUX 13, together with predetermined OSD image data generated by the process of the CPU 19, is supplied to the image combining processing circuit 16 in accordance with the operation input from the user through the input I/F 26, and the additional information is displayed together with the moving image.

Next, when the data of the received broadcast content is to be recorded in, for example, the HDD 24, in the DMUX 13, a moving-image stream, an audio stream, copy control information, etc., are demultiplexed. Only when the CPU 19 determines that the data is content that can be copied by referring to the copy control information, the moving-image stream and the audio stream are supplied to the HDD 24 through the internal bus 27, whereby the streams are recorded. At this time, as will be described later, the data of each stream is encrypted by the processing of the encryption processing circuit 23 as necessary and is supplied to the HDD 24. Furthermore, when the broadcast content is to be directly recorded on the BD 25a, only when the broadcast content is content that can be copied similarly, the moving-image stream and the audio stream, which are demultiplexed by the DMUX 13, are encrypted as necessary and are supplied to the BDD 25, whereby they are recorded on the BD 25a.

In addition, in the video recorder 1, content data may be received from, for example, an external tuner device, and may be recorded in the HDD 24 and the BD 25a. Here, when video content is to be received as digital data from an external device, it is preferable that mutual authentication be performed between the external device and the video recorder 1. For example, a method is adopted in which, in the communication I/F for transmitting and receiving content data, whether or not the content data is compliant with the defined protection information is mutually authenticated, the content data is further encrypted and transmitted on the transmission side, and the content data received on the receiving side (here, the video recorder 1) is decrypted.

When the video content recorded in the HDD 24 or the BD 25a is to be played back, a moving-image stream and an audio stream, which form the content data, are read from the HDD 24 or from the BD 25a through the BDD 25. The moving-image stream and the audio stream are supplied to the MPEG video decoder 14 and the MPEG audio decoder 15, respectively, whereby they are subjected to an expansion decoding process, and an image signal and an audio signal are output externally. Also, when the content data recorded in the HDD 24 or the BD 25a is encrypted, the content data is decrypted by the processing of the encryption processing circuit 23 and is supplied to the MPEG video decoder 14 and the MPEG audio decoder 15.

When the video content recorded in the HDD 24 is to be moved to the BD 25a, the content data is read from the HDD 24, is supplied to the BDD 25 through the internal bus 27, and is recorded on the BD 25a. At this time, as will be described later, based on the copy control information extracted from the content data read from the HDD 24, the CPU 19 supplies the content data read from the HDD 24 as required to the encryption processing circuit 23, whereby the content data is decrypted. Thereafter, the CPU 19 encrypts the content data again, and supplies it to the BDD 25.

Figure 2:
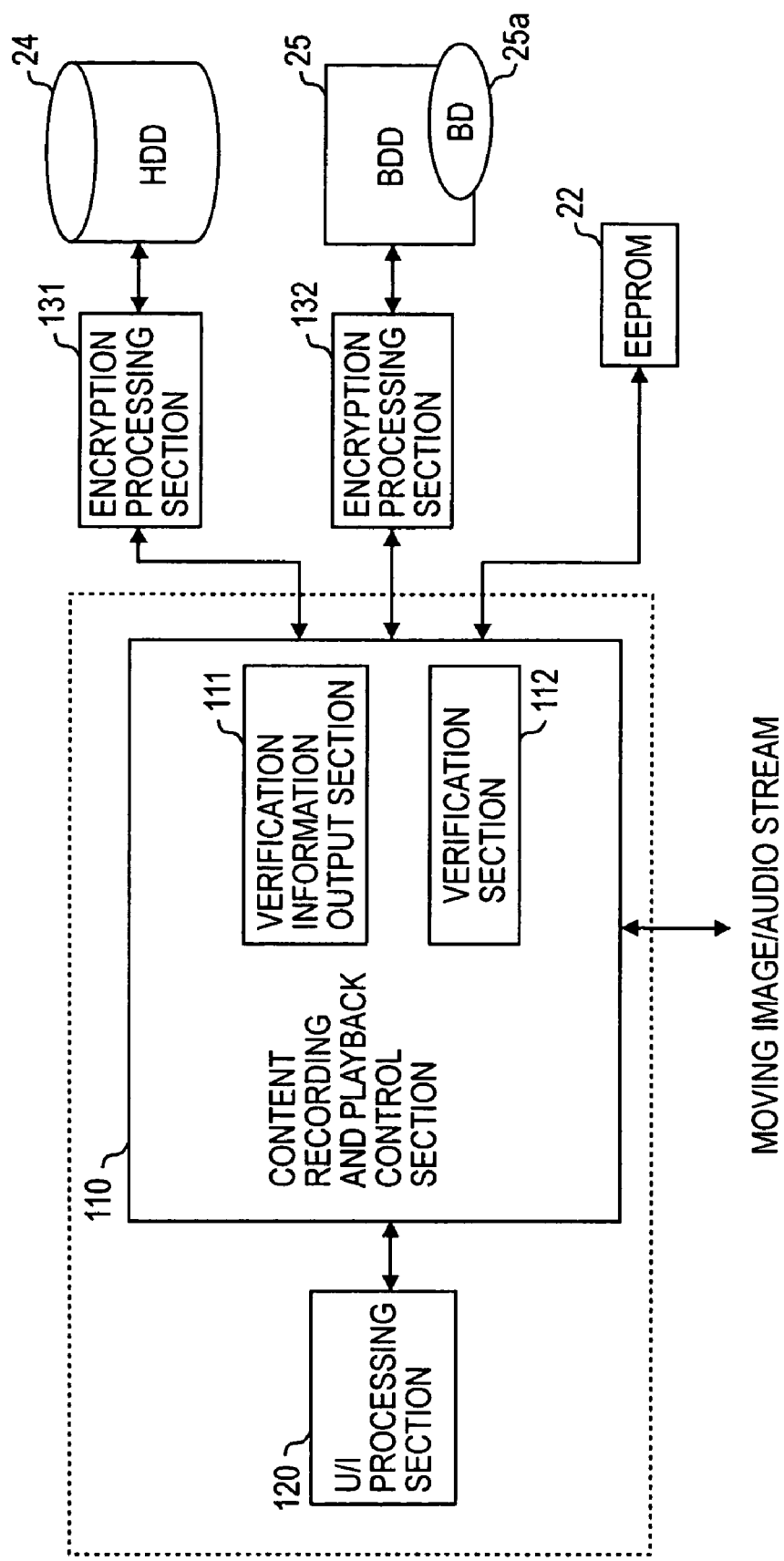
FIG. 2 is a block diagram showing functions for recording and playing back content data possessed by the video recorder according to the embodiment of the present invention.

Next, a description is given of control for copying content data into the HDD 24 or the BD 25a. FIG. 2 is a block diagram showing functions for recording and playing back content data possessed by the video recorder 1.

As shown in FIG. 2, the video recorder 1 includes a content recording and playback control section 110 for controlling the operation for recording and playing back content data, a user interface (U/I) processing section 120 for accepting an input operation from the user, and the encryption processing sections 131 and 132 for performing content data encryption and decryption processes during recording and playback into and from the HDD 24 or the BD 25a. Among the above, the content recording and playback control section 110 and the U/I processing section 120 are implemented as a result of an application program being executed by the CPU 19. Furthermore, both the encryption processing sections 131 and 132 are implemented by the processing of the encryption processing circuit 23.

The content recording and playback control section 110 controls content data recording, playback, and movement operations in accordance with a control signal input from the U/I processing section 120. For example, when content data such as broadcast content is received and recorded in the HDD 24 or the BD 25a, the content recording and playback control section 110 receives content data input from the DMUX 13, etc., and supplies the content data to the HDD 24 or the BDD 25, whereby it is recorded. At this time, the content recording and playback control section 110 causes the encryption processing section 131 or 132 to perform an encryption process in accordance with the copy control information attached to the content data when necessary, and causes the encrypted content data to be recorded in the HDD 24 or the BD 25a.

When the content data recorded in the HDD 24 or the BD 25a is to be played back, a moving-image stream and an audio stream are demultiplexed from the content data read therefrom, the moving-image stream and the audio stream are supplied to the MPEG video decoder 14 and the MPEG audio decoder 15, respectively, whereby the streams are subjected to a decoding process. At this time, when the content data recorded in the HDD 24 or the BD 25a has been encrypted, the content recording and playback control section 110 causes the encryption processing section 131 or 132 to perform a decryption process, and stream data is demultiplexed from the decrypted content data.

When the encryption and decryption processes are to be performed by the encryption processing section 131, the content recording and playback control section 110 reads the set ID that is unique to each video recorder, which is recorded in the EEPROM 22 in such a manner that it cannot be rewritten, and supplies the set ID as one of the encryption and decryption keys to the encryption processing section 131. Furthermore, when the encryption and decryption processes are to be performed by the encryption processing section 132, the content recording and playback control section 110 reads, through the BDD 25, the disc ID that is unique to each video recorder, which is recorded in the BCA area of the BD 25a in such a manner that it cannot be rewritten, and supplies the disc ID as one of the encryption and decryption keys to the encryption processing section 132.

Furthermore, the content recording and playback control section 110 includes a verification information output section 111 and a verification section 112 as function blocks required when content data is moved from the HDD 24 to the BD 25a. The verification information output section 111 outputs verification information each time the content data is recorded in the HDD 24 and the BD 25a and each time the content data is moved, the verification information becoming necessary during a movement thereafter.

Then, the output verification information is overwritten into, for example, verification files provided as specific files for verification in the HDD 24 and the EEPROM 22. In this case, as the verification information, unique information such as a random number or a time stamp is used. Furthermore, in one of the verification files, information such that the other verification information is encrypted may be recorded.

Alternatively, the output verification information may be recorded only in the verification file in the EEPROM 22. In this case, for the verification information, information associated with all the information in the HDD 24 is used. For example, a parity value and a hashed value of all the information in the HDD 24, or a parity value and a hashed value of management information (directory information, etc.) for managing all the information are suitable as the verification information.

When content data is to be moved, the verification section 112 verifies the pieces of the verification information read from the verification files and permits the movement thereof only when they are correctly authenticated. When the verification files are provided in the HDD 24 and the EEPROM 22, for example, an authentication is performed based on the matching determination between the pieces of the verification information read from the HDD 24 and the EEPROM 22 or between the information such that one of the pieces of the information is decrypted and the other information. When the verification information is provided only in the EEPROM 22, an authentication is performed based on whether or not the correlation between the verification information read from the verification file and all the data within the HDD 24 is correct. More specifically, the verification information read from the verification file is verified against the computed value, such as a parity value or a hashed value such that all the data in the HDD 24 or management information is computed in accordance with a predetermined calculation equation, and, an authentication is performed based on the matching determination.

[First Example of Processing]

Next, a description is given of a process when unique information is used as verification information. Here, a random number is used as an example of the verification information. When unique information is used as verification information, as a specific file for verification during a movement, a verification file is provided in both the HDD 24 and the EEPROM 22.

Figure 3:
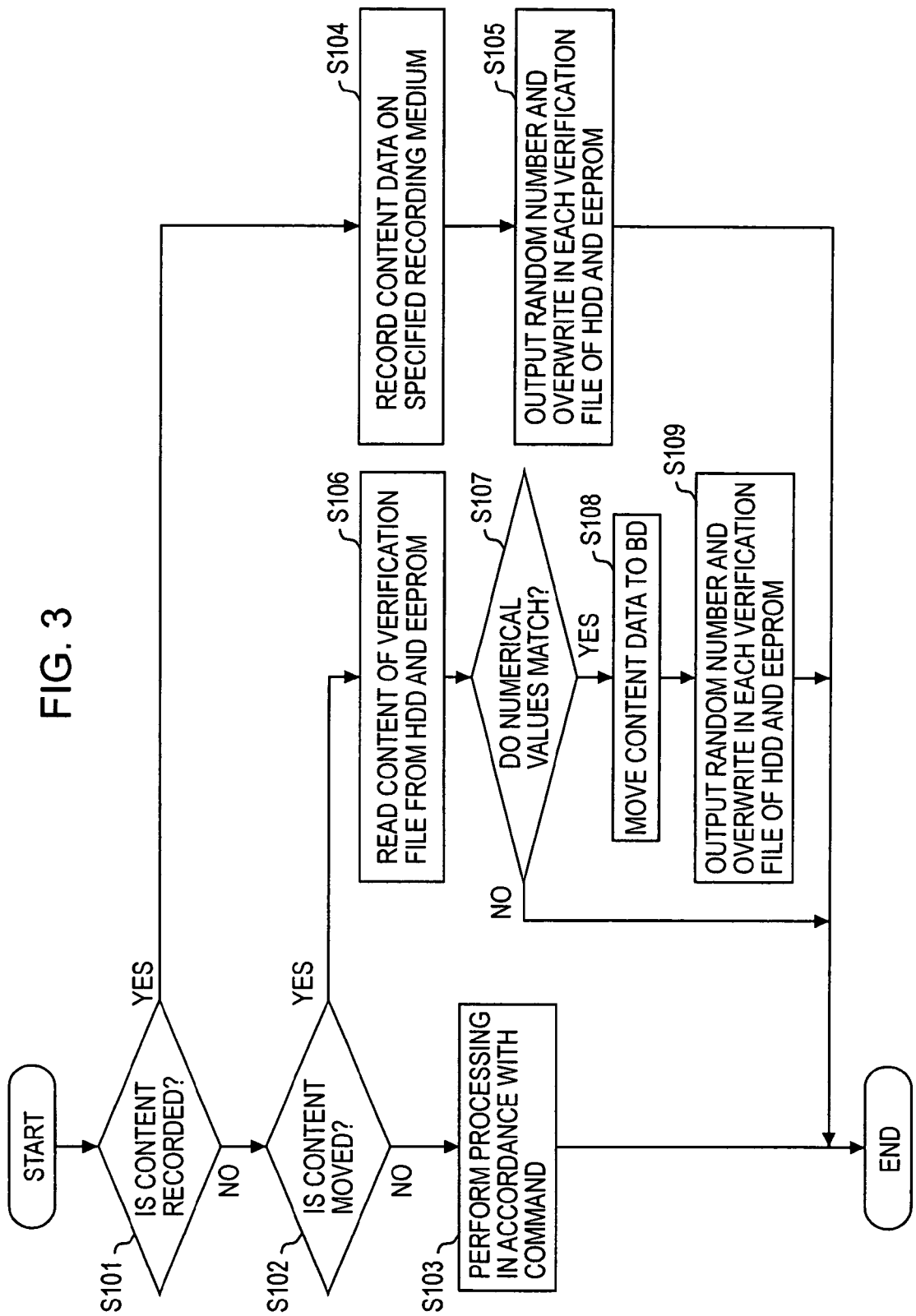
FIG. 3 is a flowchart showing the processing flow of a content recording and playback control section when content data is recorded and moved in a case where a random number is used as verification information.

FIG. 3 is a flowchart showing the processing flow of the content recording and playback control section 110 when content data is to be recorded and moved.

The processing of the flowchart in FIG. 3 is performed when a command for requesting recording, playback, etc., of content data is input from the U/I processing section 120 to the content recording and playback control section 110. Here, when it is determined in step S101 that the recording of the video content is requested in accordance with the input command, the processing of steps S104 and S105 is performed. When it is determined in step S102 that the movement of the video content is requested, the processing of steps S106 to S109 is performed. Then, when an operation other than recording and movement is requested, in step S103, processing in accordance with the command (for example, playback of content data) is performed, and the processing is completed.

When a recording is requested, in step S104, the input content data is recorded on the specified recording medium (the HDD 24 or the BD 25a). At this time, as necessary, the encryption processing section 131 is made to encrypt the content data and the copy control information, and the processed information is recorded on the recording medium.

In step S105, the verification information output section 111 (the random number output section 111a (to be described later)) outputs a new random number as verification information and overwrites the random number in each verification file in the HDD 24 and the EEPROM 22. This completes the recording process.

On the other hand, when a movement is requested, in step S106, the content of each verification file within the HDD 24 and the EEPROM 22 is read. In step S107, a determination is made as to whether or not the pieces of the read verification information match each other. When they match in this determination, the process proceeds to step S108, and when they do not match, the processing is completed without performing a movement.

In step S108, the content data recorded in the HDD 24 is moved to the BD 25a. That is, the content data in the HDD 24 is read, the content data is transferred to the BDD 25, whereby it is recorded on the BD 25a, and the content data in the HDD 24 is erased (or invalidated).

In step S109, the verification information output section 111 outputs a new random number and overwrites the random number in each verification file in the HDD 24 and the EEPROM 22. This completes the movement process.

Figure 4:
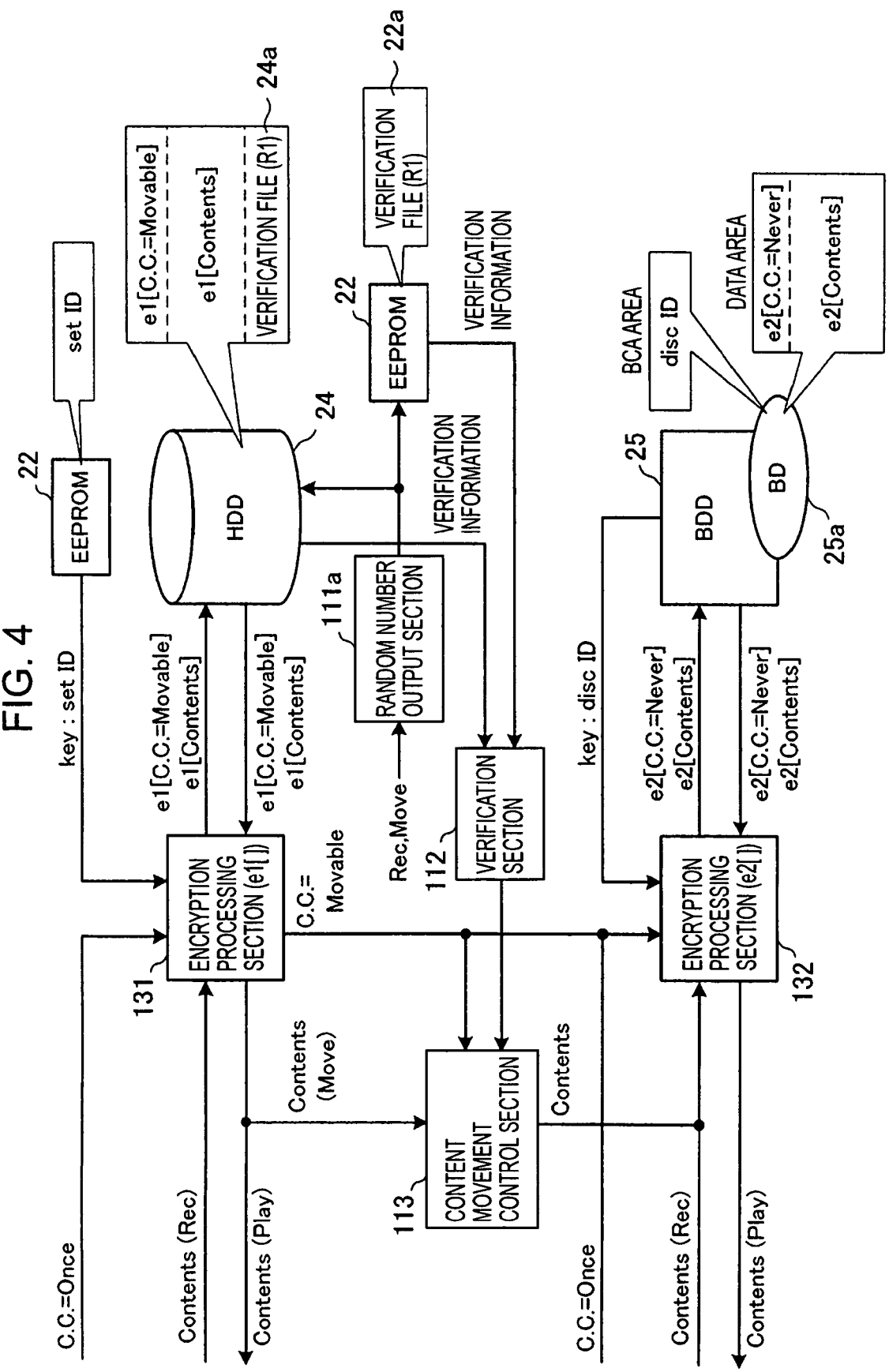
FIG. 4 illustrates a specific operation when content data is recorded, played back, and moved in a case where a random number is used as verification information.

FIG. 4 illustrates a specific operation when content data is to be recorded, played back, and moved in a case where a random number is used as verification information.

In FIG. 4, as an example of the verification information output section 111, the random number output section 11a for outputting a random number as verification information is shown. The function in the content recording and playback control section 110 for performing operation control when the content data is moved is indicated particularly as a content movement control section 113. The illustration of the function block for performing normal recording and playback of content data is omitted. In FIG. 4, encryption information such that, for example, information "A" is encrypted by the encryption processing sections 131 and 132 is indicated as "e1[A]" and "e2[A]", respectively.

When the video content is to be recorded in the HDD 24, the content recording and playback control section 110 supplies the content data supplied from the DMUX 13, etc., and the copy control information attached thereto to the encryption processing section 131. Here, only when the copy control information is "copy once" indicating the state in which one copy is permitted, the content recording and playback control section 110 supplies the set ID read from the EEPROM 22 to the encryption processing section 131 so as to make a request for encryption to be performed. The encryption processing section 131 encrypts the content data using the key based on the set ID, and also, changes the copy control information to "movable" indicating the state in which movement is permitted, and encrypts this copy control information using the same key. The HDD 24 stores therein the encrypted content data and the encrypted copy control information. The copy control information may also be recorded in the HDD 24 without being encrypted.

in the manner described above, as a result of encrypting the content data using the set ID and recording it in the HDD 24, it is possible to prevent the content data from being illegally played back with the content data recorded in the HDD 24 being copied bit-by-bit in another recording medium or with the HDD 24 itself being loaded into another video recorder.

When the copy control information attached to the input content data is "copy never" indicating that copying is prohibited, the content recording and playback control section 110 does not record the content data in the HDD 24. When the copy control information is "copy free" indicating that there is no limitation on copying, the content data needs not to be encrypted. In that case, the copy control information recorded in the HDD 24 may be kept as is as "copy free" or may be changed to "movable".

When the content data and the copy control information are recorded in the HDD 24, the random number output section 111a outputs a new random number. The output random number is overwritten into a verification file 22a in the EEPROM 22 and a verification file 24a in the HDD 24.

When the video content in the HDD 24 is to be played back, the content recording and playback control section 110 reads the specified content data and the copy control information corresponding thereto from the HDD 24 and supplies them to the encryption processing section 131. Furthermore, the set ID read from the EEPROM 22 is also supplied to the encryption processing section 131, and the encryption processing section 131 decrypts the content data and the copy control information from the HDD 24 by using the key based on the set ID. The decrypted content data is supplied, under the control of the content recording and playback control section 110, to the MPEG video decoder 14 and the MPEG audio decoder 15, whereby it is decoded. As a result, a moving image and sound are played back and output.

On the other hand, when the video content is to be recorded on the BD 25a, when the copy control information attached to the content data is "copy once", a request for the encryption of this content data is made from the content recording and playback control section 110 to the encryption processing section 132. The encryption processing section 132 receives, through the content recording and playback control section 110, the disc ID read from the BCA area of the BD 25a via the BDD 25. Then, using the key based on the disc ID, the encryption processing section 132 encrypts the content data, and also, changes the copy control information to "copy never", encrypts it using the same key, and outputs the content data and the copy control information to the BDD 25. As a result, the BDD 25 records the encrypted content data and the encrypted copy control information into the data area of the BD 25a. The copy control information may also be recorded on the BD 25a without being encrypted.

As described above, as a result of encrypting the content data using the disc ID and recording it on the BD 25a, it is possible to prevent the content data recorded on the BD 25a from being copied bit-by-bit and illegally played back.

Similarly to the case of recording into the HDD 24, when the input copy control information of the content data is "copy never", the content recording and playback control section 110 does not record the content data on the BD 25a. When the copy control information is "copy free", similarly, the content data needs not to be encrypted. In that case, the copy control information output to the BDD 25 may be kept as is as "copy free" or may be changed to "movable".

Also, when the content data and the copy control information are recorded on the BD 25a, similarly to the recording into the HDD 24, the random number output section 111a outputs a new random number, and the random number is overwritten in the verification file 22a in the EEPROM 22 and the verification file 24a in the HDD 24.

When the video content in the BD 25a is to be played back, the content recording and playback control section 110 reads the specified content data and the copy control information corresponding thereto from the BD 25a through the BDD 25, also reads the disc ID from the BCA area of the BD 25a, and supplies them to the encryption processing section 132. The encryption processing section 132 decrypts the content data and the copy control information from the BDD 25 by using the key based on the disc ID. The decrypted content data is supplied, under the control of the content recording and playback control section 110, to the MPEG video decoder 14 and the MPEG audio decoder 15, whereby they are decoded. As a result, a moving image and sound are played back and output.

Next, when the content data recorded in the HDD 24 is to be moved to the BD 25a, the content data and the copy control information corresponding thereto are read under the control of the content movement control section 113 in the content recording and playback control section 110. At this time, when the copy control information is "movable", a request for decrypting the content data and the copy control information is made to the encryption processing section 131. The encryption processing section 131 receives the set ID in the EEPROM 22 through the content movement control section 113, decrypts the content data and the copy control information from the HDD 24 by using the key based on the set ID, and supplies them to the content movement control section 113.

On the other hand, the content movement control section 113 reads the verification information (the random number) recorded in the verification file 24a and the verification file 22a in the HDD 24 and the EEPROM 22, respectively, and causes the verification section 112 to verify them. The verification section 112 determines that they are correctly authenticated when the pieces of the verification information match, and notifies the content movement control section 113 of the fact that a movement is permitted. The content movement control section 113 receiving this notification further confirms that the copy control information from the encryption processing section 131 is "movable", and thereafter supplies the copy control information and the content data to the encryption processing section 132 so as to make a request to encrypt them.

The encryption processing section 132 receives the disc ID read from the BD 25a by the BDD 25 through the content movement control section 113, and encrypts the content data and the copy control information by using the key based on the disc ID. At this time, the encryption processing section 132 changes the copy control information to "copy never" and encrypts it. The BDD 25 records the encrypted content data and the encrypted copy control information into the BD 25a.

Furthermore, the content movement control section 113 further erases (invalidates) the associated content data recorded in the HDD 24. Then, the content movement control section 113 causes the random number output section 111a to output a new random number and to cause the output random number to be overwritten in the verification files 24a and 22a in the HDD 24 and the EEPROM 22, respectively. This completes the movement process.

In the above operation, each time content data is recorded into the HDD 24 and the BD 25a, a random number that is newly output from the random number output section 111a is overwritten in the verification files 24a and 22a within the HDD 24 and the EEPROM 22, respectively. Furthermore, when the content data is moved from the HDD 24 to the BD 25a, a new random number from the random number output section 111a is overwritten in the verification files 24a and 22a. Then, only when the copy control information of the content data in the HDD 24 is "movable" and the verification information is correctly authenticated in the verification section 112, the movement of the content data is permitted.

As a result of such an operation, as described with reference to FIG. 5 below, even when the HDD 24 is taken out and the recording information of the HDD 24 can be copied bit-by-bit in an external device such as a PC, it is possible to prevent the content data from being illegally copied in the BD 25a using the HDD 24 relocated to the video recorder 1.

Figure 5:
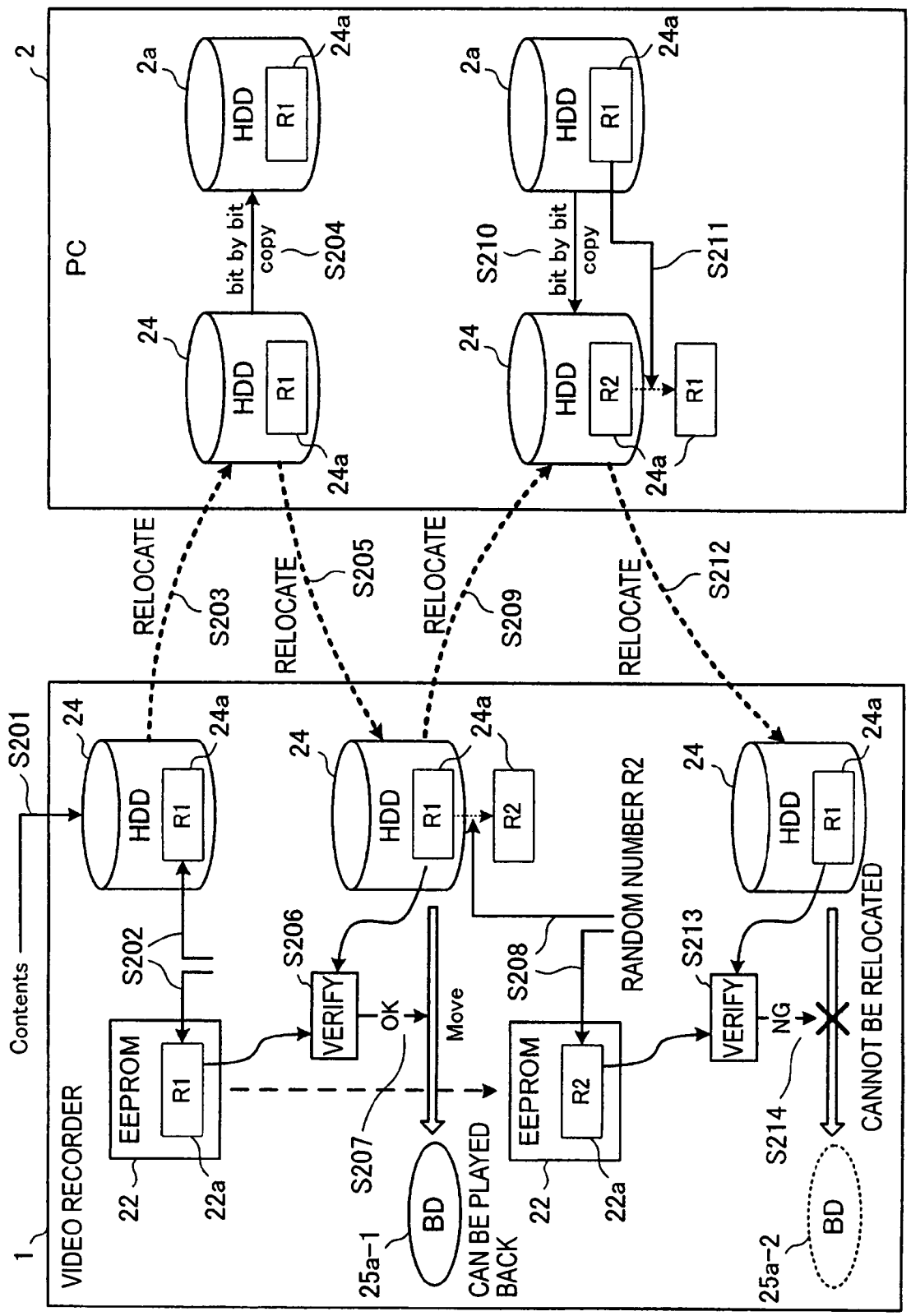
FIG. 5 illustrates the advantages of preventing illegal copying.

FIG. 5 illustrates the advantages of preventing illegal copying.

In FIG. 5, a case is assumed in which a PC 2 is used as an example of an external device. For the HDD 24, a general-purpose I/F is used, and the HDD 24 can be used in both the video recorder 1 and the PC 2. Furthermore, it is assumed that another HDD 2a is connected to the PC 2.

In such a case, first, when content data is to be recorded in the HDD 24, the content data is encrypted as described above and is recorded in the HDD 24 (step S201). Along with this recording, a random number "R1" is output as verification information from the random number output section 1a, and the random number "R1" is recorded in the verification files 24a and 22a in the HDD 24 and the EEPROM 22, respectively (step S202).

In this state, the HDD 24 is taken out from the video recorder 1 and is relocated to the PC 2 (step S203). Then, all the data within the relocated HDD 24 is copied bit-by-bit into the HDD 2a (step S204). As a result, a state is reached in which the verification file 24a having recorded therein the encrypted content data, the encrypted copy control information, and the encrypted random number "R1" is recorded in both the HDD 24 and the HDD 2a.

Thereafter, the HDD 24 is taken out from the PC 2 and is relocated to the video recorder 1 (step S205). Then, in the video recorder 1, the content data in the HDD 24 is moved to the BD (25a-1). At this time, the verification files 24a and 22a in the HDD 24 and the EEPROM 22 are read and verified, respectively (step S206). Since the random number "R1" is recorded in both the files, the verification result indicates that a movement is possible (step S207), and the content data in the HDD 24 is normally moved to the BD (25a-1). Furthermore, the random number output section 111a outputs another random number "R2", and overwrites the random number "R2" in both the verification files 24a and 22a in the HDD 24 and the EEPROM 22, respectively (step S208).

Next, the HDD 24 is taken out again from the video recorder 1 and is relocated to the PC 2 (step S209). Then, the information copied from the HDD 24 in step S204 is copied bit-by-bit from the HDD 2a to the HDD 24 (step S210). At this time, the content data is recorded again in the HDD 24, and also, the value recorded in the verification file 24a is changed to the random number "R1" (step S211).

Thereafter, the HDD 24 is taken out again from the PC 2 and is relocated to the video recorder 1 (step S212). Then, in the video recorder 1, when attempts are made to move the content data in the HDD 24 to a BD (25a-2), the verification files 24a and 22a in the HDD 24 and the EEPROM 22 are read and verified, respectively (step S213). However, since the random numbers "R1" and "R2" are recorded in the verification files 24a and 22a, respectively, it is determined that a movement is not possible (step S214), and thus the content data cannot be recorded on the BD (25a-2). Therefore, only the BD (25a-1) is produced as a valid copy product, and illegal copying is prevented.

As described above, during the recording and the movement of the content data, the verification files 24a and 22a in the HDD 24 and the EEPROM 22 are updated respectively using unique verification information, and the content of the verification file 24a is verified against the content of the verification file 22a. As a result, even when the HDD 24 is relocated to an external device and the recording information thereof is copied bit-by-bit, the movement of the content data from the HDD 24 relocated to the video recorder 1 again to a portable recording medium such as the BD 25a is limited to only one time, and the manufacture of copy products in a large amount by performing two or more times of movements is impossible.

Therefore, even if a general-purpose device having an I/F specification common to that of the PC 2 is used as the HDD 24, it becomes possible to ensure the safety of the copyright-protected content data. Then, by using the highly general-purpose HDD 24, it becomes possible to reduce the manufacturing cost of the video recorder 1.

In the above-described operation, the verification information recorded in the verification files 24a and 22a serves the function of identifying whether or not the recording information in the HDD 24 is falsified. In order to serves such a function, at least when the content data is recorded in the HDD 24 and when the content data is moved from the HDD 24 to the BD 25a, the verification information of each of the verification files 24a and 22a should be updated by a new random number. It is preferable that the updating of the verification information always be performed when, in addition to the content data, some kind of information is updated in the HDD 24.

[Second Example Of Processing]

In the above-described first example of processing, the process for verifying verification information by the verification section 112 is performed only when content data is moved. In addition, for example, the verification process may be performed when content data is recorded in the HDD 24 and the BD 25a and when content data is played back.

Figure 6:
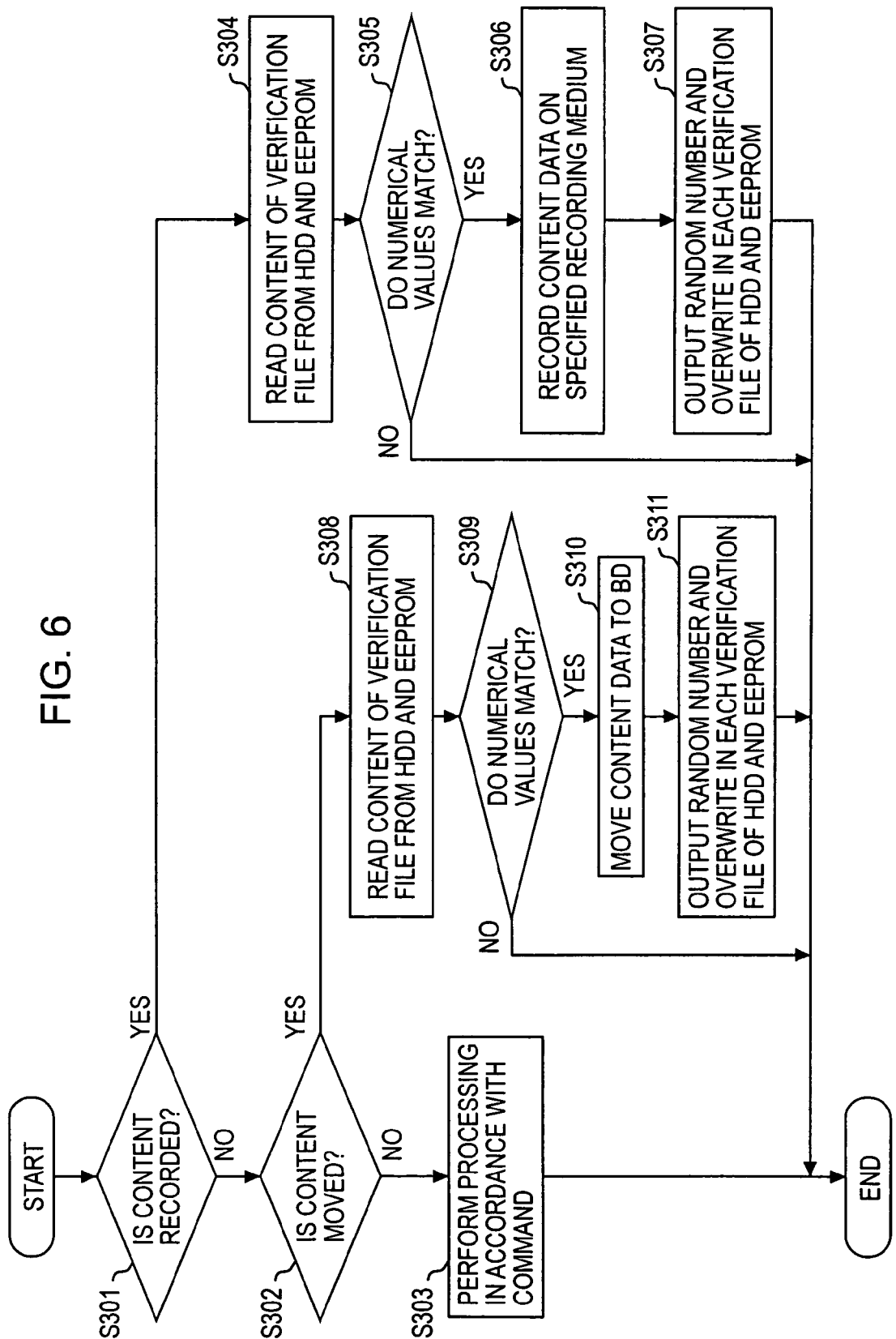
FIG. 6 is a flowchart showing the processing flow of the content recording and playback control section when verification information is verified when content data is recorded as well.

FIG. 6 is a flowchart showing the processing flow of the content recording and playback control section 110 when verification information is verified when content data is recorded as well.

In FIG. 6, similarly to the processing in FIG. 3, in steps S301 and S302, a determination is made as to the kind of operation requested by the input command. When the recording of the content data is requested, the processing of steps S304 to S307 is performed. When the movement of the content data is requested, the processing of steps S308 to S311 is performed. Steps S308 to S311 correspond to steps S106 to S109 in FIG. 3, respectively, and accordingly, descriptions thereof are omitted. When an operation other than those is requested, in step S303, processing corresponding to the command is performed similarly to step S103 in FIG. 3.

When a recording is requested, in step S304, first, the content of the verification files 24a and 22a of the HDD 24 and the EEPROM 22 is read, respectively, and in step S305, a determination is made as to whether or not the pieces of the read verification information match. When this determination shows that they match, the process proceeds to step S306, and when they do not match, the processing is completed without performing the recording.

In step S306, the input content data is recorded on the specified recording medium (the HDD 24 or the BD 25a). At this time, as necessary, the encryption processing section 131 is made to encrypt the content data and the copy control information, and the processed information is recorded on the recording medium.

In step S307, the random number output section 111a outputs a new random number and overwrites the random number in the verification files 24a and 22a of the HDD 24 and the EEPROM 22, respectively. This completes the recording process.

As a result of the above processing, when the verification section 112 determines that the content of the HDD 24 is falsified, thereafter, it becomes impossible to perform any recording operation on the HDD 24 and the BD 25a. Also, during the playback of the content data, similarly, a verification may be performed by the verification section 112, and when an authentication is not performed correctly, the playback operation may not be performed. As described above, by making the operation limitation after illegal copying is performed stronger, it is possible to prevent illegal copying with a higher degree of reliability and possible to increase the prevention effect.

[Third Example Of Processing]

In the above-described processing example, the verification information (the random number) is recorded as is in the verification files 24a and 22a of the HDD 24 and the EEPROM 22, respectively. As a result of encrypting and recording one or both of the pieces of the verification information, the verification information can be prevented from being decrypted, and the safety against illegal copying can be further increased.

Figure 7:
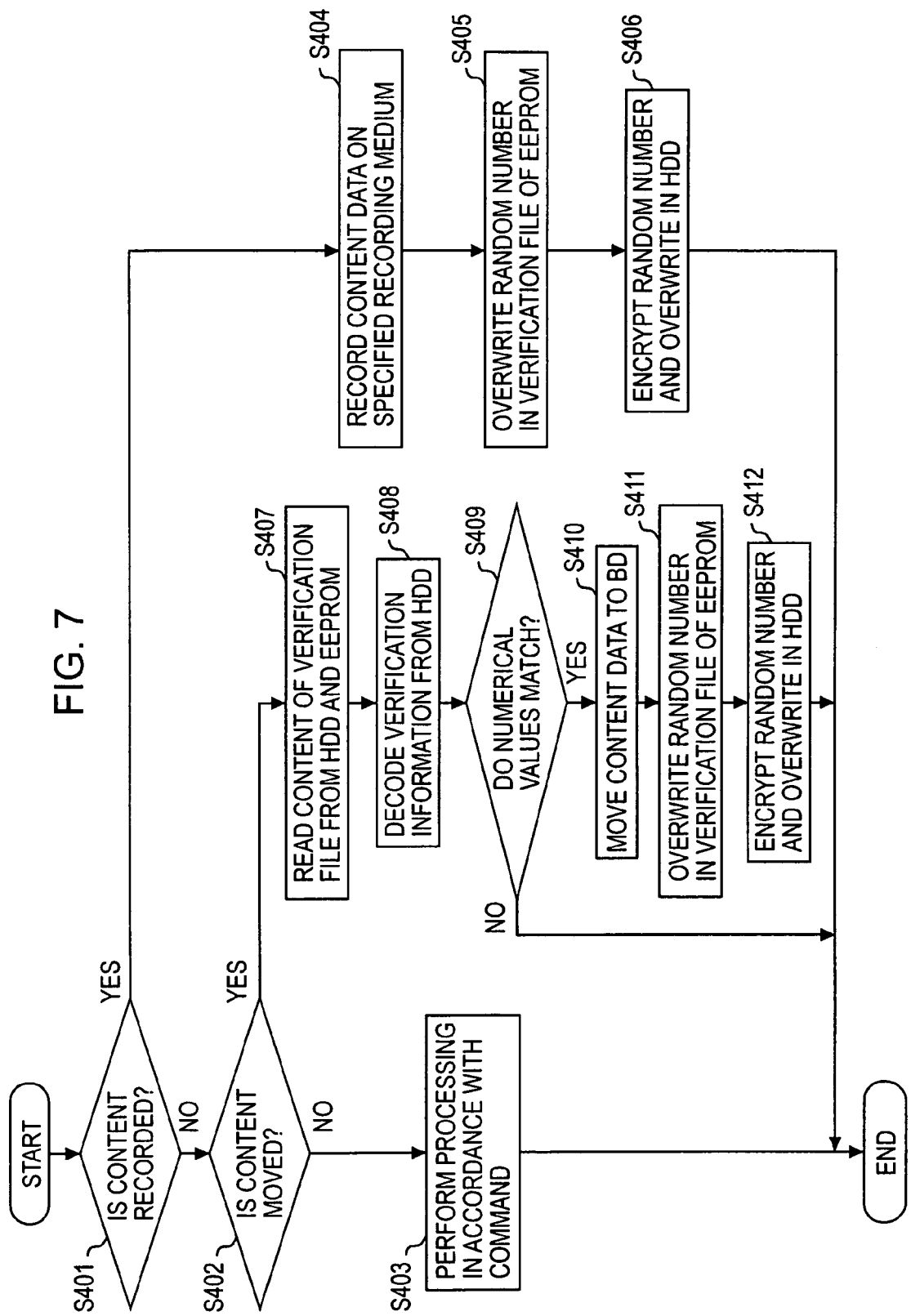
FIG. 7 is a flowchart showing the processing flow of the content recording and playback control section when encrypted verification information is to be recorded in an HDD.

FIG. 7 is a flowchart showing the processing flow of the content recording and playback control section 110 when encrypted verification information is to be recorded in the HDD 24.

In FIG. 7, similarly to the processing in FIG. 3, in steps S401 and S402, a determination is made as to the kind of operation requested by the input command. When the recording of content data is requested, the processing of steps S404 to S406 is performed, and when the movement of the content data is requested, the processing of steps S407 to S412 is performed. When an operation other than those is requested, in step S403, similarly to step S103 in FIG. 3, processing in accordance with the command is performed.

When the recording is requested, in step S404, the input content data is recorded on the specified recording medium (the HDD 24 or the BD 25a). Next, in step S405, a new random number is output, and it is overwritten in the verification file 22a of the EEPROM 22. Furthermore, in step S406, the output random number is encrypted, and it is overwritten in the verification file 24a of the HDD 24.

On the other hand, when a movement is requested, in step S407, the content of each verification file in the HDD 24 and the EEPROM 22 is read. Here, since the verification information from the HDD 24 is encrypted, in step S408, the verification information is decrypted. Then, in step S409, a determination is made as to whether or not the decrypted verification information matches the verification information from the EEPROM 22. When the result shows that they match, the process proceeds to step S410, whereby the content data in the HDD 24 is read and recorded on the BD 25a, and the movement operation for erasing (invalidating) the associated content data in the HDD 24 is performed. When the pieces of the verification information do not match, the processing is completed without performing the movement.

Steps S411 and S412 are identical to the above-described steps S405 and S406, respectively. A new random number is overwritten in the verification file 22a within the EEPROM 22, and the random number is encrypted and overwritten in the verification file 24a of the HDD 24.

As a result of the above processing, since the encrypted verification information is recorded in the verification file 24a of the HDD 24, the content of the verification information is prevented from being analyzed in the PC or the like with, for example, the HDD 24 being taken out. Thus, it becomes possible to prevent illegal copying with a higher degree of reliability.

The processes for encrypting and decrypting the verification information should be performed by the content recording and playback control section 110, that is, by a software process by the CPU 19. Alternatively, this processing may be performed by the encryption processing circuit 23. As the key information for encrypting and decrypting the verification information, similarly to the case of the content data and the copy control information to be recorded in the HDD 24, the set ID recorded in the EEPROM 22 should be used.

[Fourth Example Of Processing]

Illegal copying as a result of the content of the HDD 24 being copied bit-by-bit and the HDD 24 being relocated to the video recorder 1 can be prevented if it can be detected as to whether or not the content of the HDD 24 is falsified. In addition to the method of using unique verification information as described above, the detection of the falsification of the HDD 24 can also be realized as follows. The video recorder 1 side holds information associated with all the recording information of the HDD 24 and during movement, a determination is made as to whether or not the correlation between that information and the recording information of the HDD 24 is correct.

More specifically, the detection of the falsification of the HDD 24 can be realized as follows. For example, a parity value, a hashed value, and the like of all the information of the HDD 24 are computed as verification information, and they are recorded, for example, in the EEPROM 22 of the video recorder 1. During a movement, the parity value, the hashed value, and the like are re-calculated from all the information of the HDD 24, and they are verified against the verification information held by the video recorder 1. Alternatively, by using the management information (for example, the directory information) for managing files in the HDD 24 on the basis of the file management system used by the video recorder 1, a parity value and a hashed value of the management information is computed, making it possible to obtain the correlation with all the information in the HDD 24. Therefore, the parity value and the hashed value of the management information may also be used as the verification information.

Figure 8:
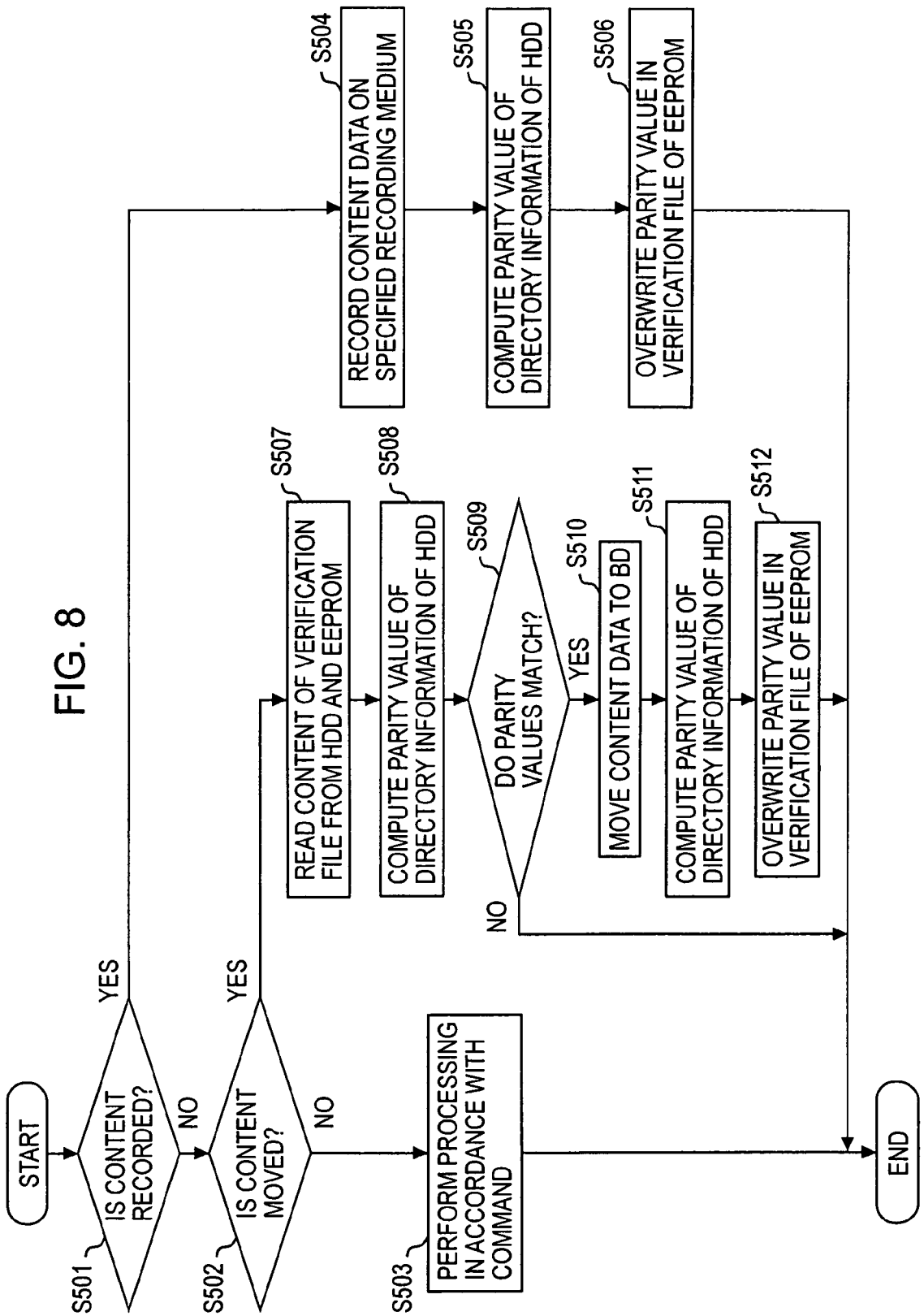
FIG. 8 is a flowchart showing the processing flow of the content recording and playback control section when content data is recorded and moved when a parity value of directory information of the HDD is used as verification information.

FIG. 8 is a flowchart showing the processing flow of the content recording and playback control section 110 when content data is recorded and moved when the parity value of the directory information of the HDD 24 is used as verification information.

In FIG. 8, similarly to the processing in FIG. 3, in steps S501 and 502, a determination is made as to the kind of operation requested by the input command. When the recording of the content data is requested, the processing of steps S504 to S506 is performed, and when the movement of the content data is requested, the processing of steps S507 to S512 is performed. When an operation other than those is requested, in step S503, processing in accordance with the command is performed.

When a recording is requested, in step S504, the input content data is recorded on the specified recording medium (the HDD 24 or the BD 25a). Next, in step S505, the parity value of the directory information of the HDD 24 is computed, and in step S506, the computed parity value is overwritten in the verification file 22a of the EEPROM 22.

On the other hand, when a movement is requested, in step S507, the content of the verification file 22a of the EEPROM 22 is read. Furthermore, in step S508, the parity value of the directory information of the HDD 24 is computed. Then, in step S509, the verification information (the parity value) from the EEPROM 22 is verified against the computed parity value. When they do not match, the processing is completed without performing a movement.

When the parity values match, the process proceeds to step S510, whereby the content data of the HDD 24 is moved to the BD 25a. Then, in step S511, the parity value of the directory information of the HDD 24, the content of which has been moved, is computed, and in step S512, the computed parity value is overwritten in the verification file 22a of the EEPROM 22.

The computation of the parity value should be performed by a software process by the CPU 19.

In the above processing, the verification information is held only in the EEPROM 22. Then, when the recording information in the HDD 24 is copied bit-by-bit to an external device and the HDD 24 is relocated to the video recorder 1, it is possible to move the recording information from the HDD 24 to the BD 25a. However, at this time, in the HDD 24, the moved content data is erased, and in that state, the parity value is computed and held in the EEPROM 22. Therefore, thereafter, when the recording information copied in the external device is copied bit-by-bit to the HDD 24 and the recording information is moved from the HDD 24, the parity value computed on the basis of the recording information in the HDD 24 does not match that in the EEPROM 22, and a movement becomes impossible. Therefore, movements at second or later times becomes impossible, and thus illegal copying is prevented.

In this example of processing, for example, when the file system used in the HDD 24 for the video recorder 1 is identical to that of an external PC, etc., if the HDD 24 is taken out and a file operation is performed in the external PC, it becomes impossible to move the content data when the HDD 24 is relocated to the video recorder 1.

[Fifth Example Of Processing]

When the content of the HDD 24 is to be falsified, the HDD 24 is taken out in a state in which the power supply of the video recorder 1 is switched off. For this reason, even if the updating of the verification information recorded in the EEPROM 22 and the HDD 24 is performed when the power supply of the video recorder 1 is switched off and the verification information is verified when the power supply of the video recorder 1 is switched on, the falsification of the HDD 24 can be detected to prevent illegal copying.

Figure 9B:
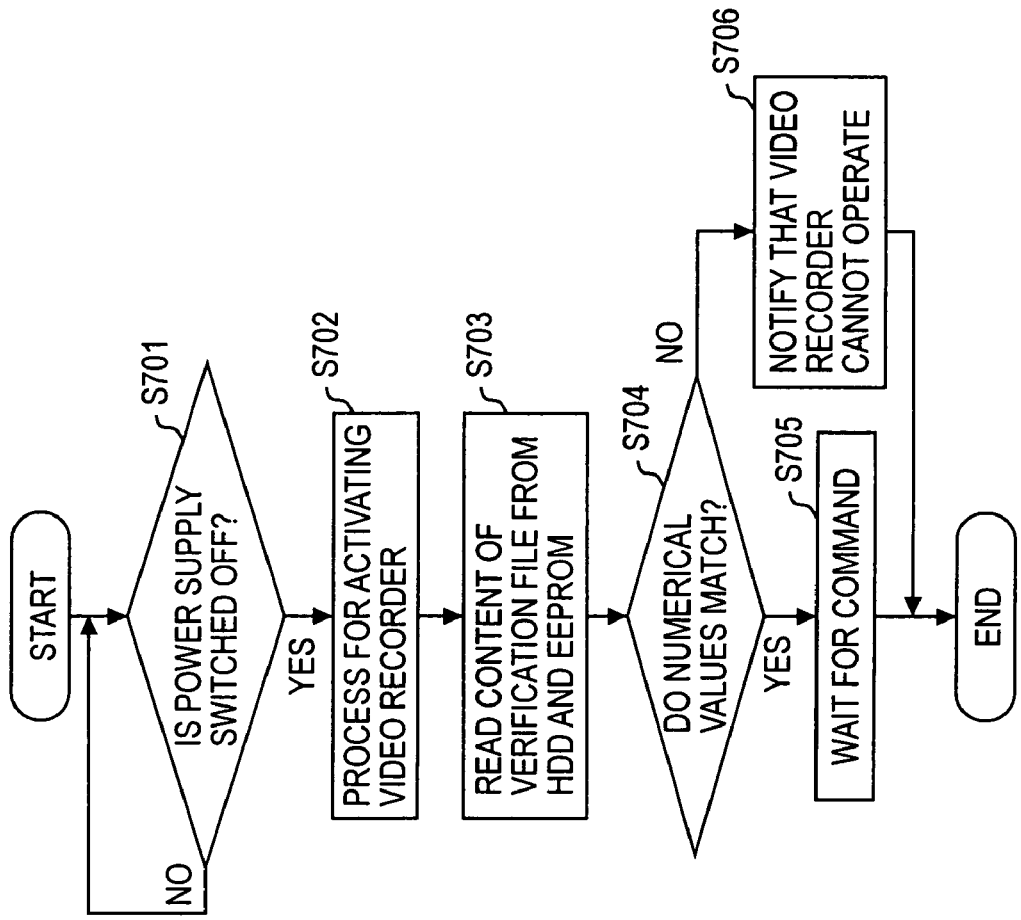
Figure 9A:
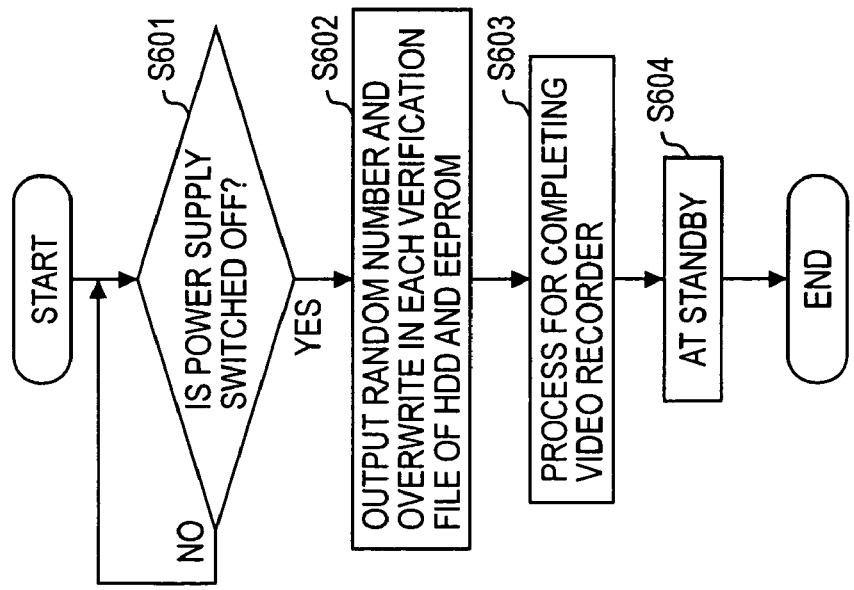
Figure 10:
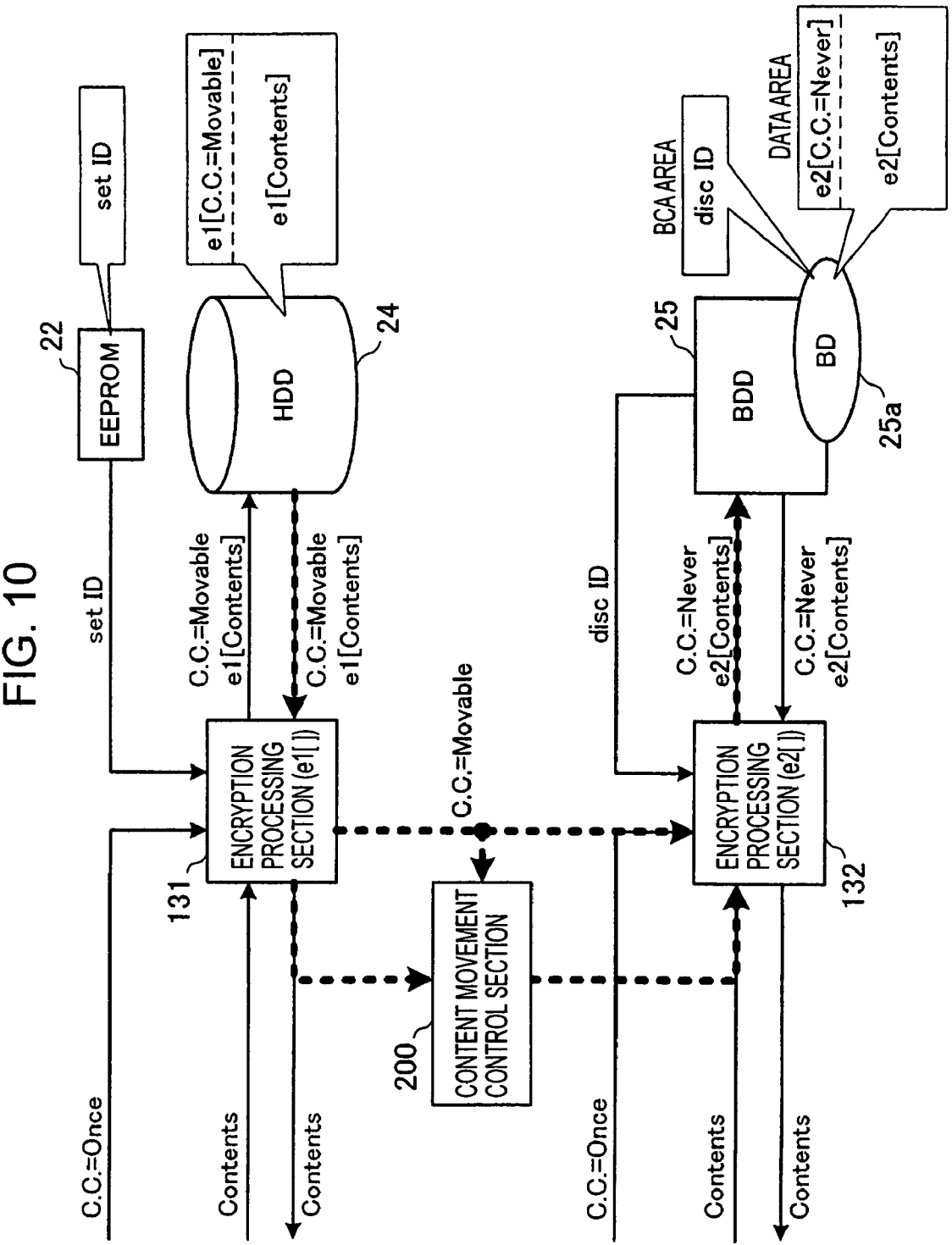
FIG. 10 is a block diagram showing an example of functions for controlling copying in a conventional video recorder having two recording media.
Figure 11:
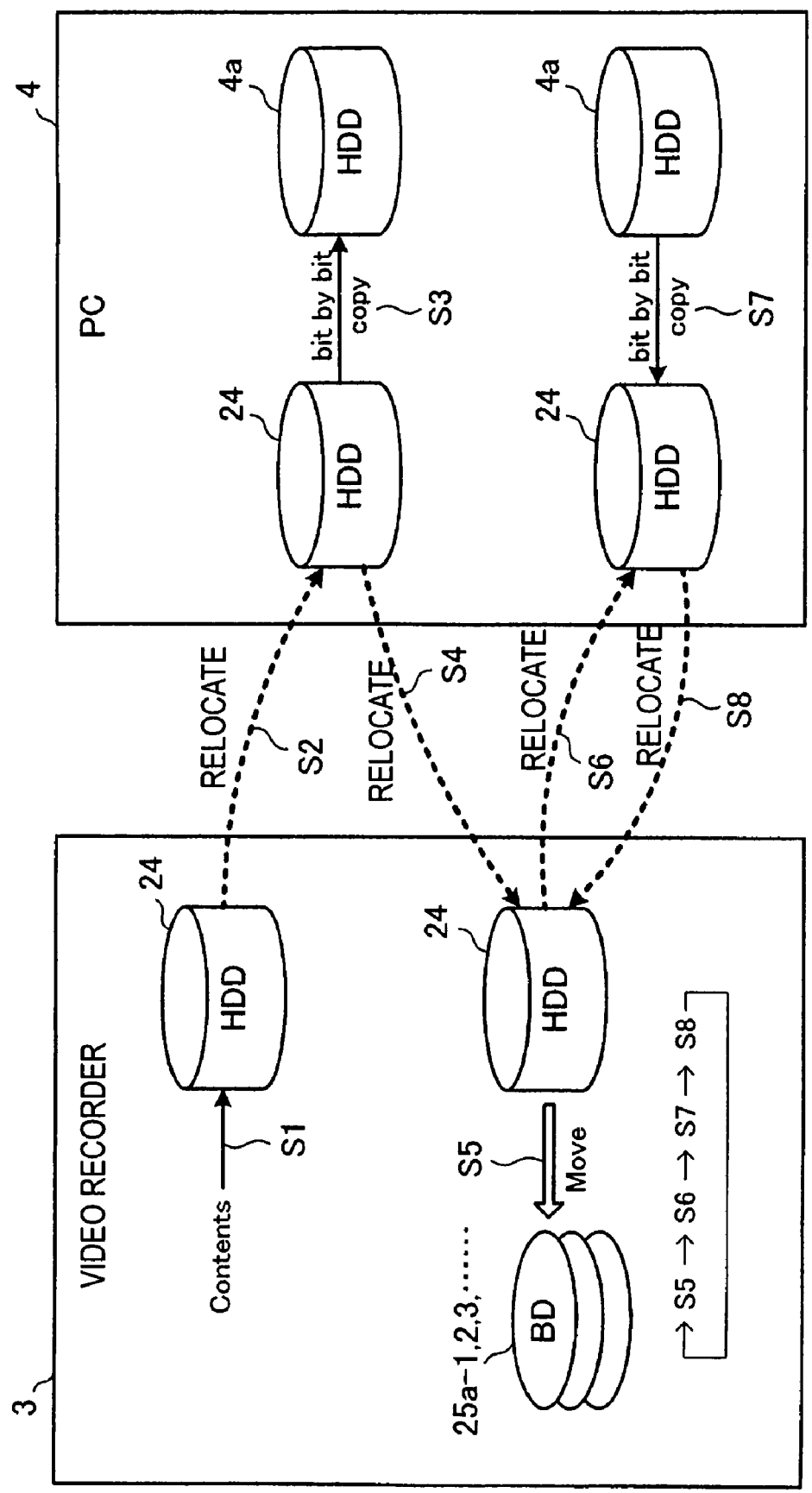
FIG. 11 illustrates illegal copying when an HDD can be relocated to an external PC and can be used.

FIG. 9A is a flowchart showing the processing flow of the video recorder 1 when the power supply is switched off. FIG. 9B is a flowchart showing the processing flow of the video recorder 1 when the power supply is switched on.

In FIGS. 9A and 9B, processing in a case where a random number is used as an example of verification information is shown. When the power supply is switched off, in step S601, it is determined whether or not an operation is input for switching off the power supply. When the operation is input, the process proceeds to step S602. In step S602, the random number output section 111a outputs a new random number and overwrites the random number in the verification files 24a and 22a of the HDD 24 and the EEPROM 22, respectively. Then, in step S603, the process for completing the video recorder 1 is performed, and in step S604, the video recorder 1 shifts to a standby state so as to wait for a request for the power supply to be switched on.

On the other hand, when the power supply is switched on, in step S701, it is determined whether or not a request for switching on the power supply is made on the basis of the operation input by the user or a timer setting. When the request is made, the process proceeds to step S702. In step S702, a start-up process, for example, a process for initializing each section of the video recorder 1, is performed.

Next, in step S703, the content of the verification files 24a and 22a of the HDD 24 and the EEPROM 22 is read, respectively. In step S704, it is determined whether or not the pieces of the read verification information match. When the result shows that they match, the process proceeds to step S705 so as to shift to a normal operating state of waiting for a command for recording and playing back content data to be issued. When the pieces of the verification information do not match, the process proceeds to step S706, whereby the fact that the video recorder 1 cannot operate is notified to the user through the display on a display unit, and thereafter, any operation other than the switching-off of the power supply is not performed. In this case, when the power supply is switched off, the completion process is performed without updating the verification information shown in step S602 in FIG. 9A.

In the above processing, when compared to the case where the verification information is rewritten each time the content data is recorded and moved, the number of rewritings can be reduced. Therefore, for example, as a recording medium for holding the verification information in the video recorder 1, a recording medium, such as a flash memory, in which there is a limitation on the number of rewritings, can be used.

The updating of the verification information should be performed at least when the recording into the HDD 24 and the movement from the HDD 24 to the BD 25a is performed from the switching on of the power supply until the power supply is switched off. For this reason, for example, flag information in which a value is set when a recording or a movement into or from the HDD 24 is performed even only once may be held, so that, when the power supply is switched off, the updating of the verification information shown in step S602 is performed only when the value is set in that flag information. As a result, the number of rewritings of the verification information can be reduced, and also, a useless process is not performed when the power supply is switched off, and the time required until the power supply is switched off can be shortened correspondingly.

In the above-described embodiments of the present invention, a BD is used as a movement destination of the content data. However, the movement destination is not limited to this example, and an optical disc medium such as a rewritable DVD or cd (Compact Disc), a magneto-optical disc medium, a semiconductor recording medium such as a flash memory, and the like can also be used. Furthermore, the present invention can also be applied to not only a case where a movement from a fixed recording medium such as an HDD to a portable recording medium such as a BD is possible, but also a case where a movement between fixed recording media or between portable recording media is possible.

The processing functions of the content recording and playback control section described in the above-described embodiments can be implemented by a computer. In that case, a program in which the processing content of the functions that should be possessed by the content recording and playback control section is described is provided. As a result of that program being executed by the computer, the above-described processing functions are implemented on the computer. The program in which the processing content is described can be recorded on a computer-readable recording medium. Examples of such a recording medium include a magnetic recording medium, an optical disc medium, a magneto-optical recording medium, and a semiconductor recording medium.

When a program is to be distributed, the program is recorded on, for example, a portable recording medium such as an optical disc medium or a semiconductor recording medium, and the portable recording medium is sold. Alternatively, a program can be stored in a storage device of a server computer, and the program can be transferred from the server computer to another computer via a network.

The computer that executes a program stores, in the storage device of its own, for example, a program recorded on a portable recording medium or a program transferred from the server computer. Then, the computer reads the program from its own storage device and executes the processing in accordance with the program. Also, the computer can directly read a program from a portable recording medium and execute the processing in accordance with the program.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An information recording and playback apparatus capable of recording information on a plurality of recording media and playing back recorded information, said information recording and playback apparatus comprising:

non-volatile information holding means for holding information;

verification information output means for outputting unique verification information and overwriting the unique verification information on a first recording medium and said information holding means at least each time content is recorded on said first recording medium and content recorded on said first recording medium is moved to a second recording medium; and verification means for verifying said verification information recorded on said first recording medium against said verification information held by said information holding means and for permitting the movement of the content when they match at least when the content recorded on said first recording medium is moved to said second recording medium.

2. The information recording and playback apparatus according to claim 1, wherein said verification information output means outputs a random number as said verification information.

3. The information recording and playback apparatus according to claim 1, wherein said verification information output means outputs a time stamp as said verification information.

4. The information recording and playback apparatus according to claim 1, wherein said verification information output means supplies said verification information to said information holding means, encrypts the verification information, and records the information on said first recording medium, and
said verification means permits the movement of content when said verification information held by said information holding means matches information such that said verification information recorded on said first recording medium is decrypted.

5. An information recording and playback apparatus capable of recording information on a plurality of recording media and playing back recorded information, said information recording and playback apparatus comprising:
verification information output means for outputting verification information associated with all the information recorded on a first recording medium at least each time content is recorded on said first recording medium and content recorded on said first recording medium is moved to a second recording medium;
non-volatile information holding means for holding most recent verification information output by said verification information output means; and
verification means for verifying information recorded on said first recording medium against said verification information held by said information holding means at least when content recorded on said first recording medium is moved to said second recording medium and for permitting the movement of the content when the correlation of the information is correctly authenticated.

6. The information recording and playback apparatus according to claim 5, wherein said verification information output means outputs, as said verification information, a parity value of management information for managing all the information recorded on said first recording medium, and
said verification means permits the movement of content when a parity value held by said information holding means matches a parity value computed from said management information recorded on said first recording medium.

7. The information recording and playback apparatus according to claim 5, wherein said verification information output means outputs, as said verification information, a parity value of all the information recorded on said first recording medium, and
said verification means permits the movement of content when a parity value held by said information holding means matches a parity value computed from all the information recorded on said first recording medium.

8. The information recording and playback apparatus according to claim 5, wherein said verification information output means outputs, as said verification information, a hashed value of management information for managing all the information recorded on said first recording medium, and
said verification means permits the movement of content when a hashed value held by said information holding means matches a hashed value computed from said management information recorded on said first recording medium.

9. The information recording and playback apparatus according to claim 5, wherein said verification information output means outputs, as said verification information, a hashed value of all the information recorded on said first recording medium, and
said verification means permits the movement of content when a hashed value held by said information holding means matches a parity value computed from all the management information recorded on said first recording medium.

10. An information recording and playback apparatus capable of recording information on a plurality of recording media and playing back recorded information, said information recording and playback apparatus comprising:
non-volatile information holding means for holding information;
verification information recording means for outputting unique verification information each time the power supply of said information recording and playback apparatus is switched off and for overwriting the unique verification information on a first recording medium and said information holding means; and
verification means for verifying said verification information recorded on said first recording medium against said verification information recorded on said information holding means when the power supply of said information recording and playback apparatus is switched on and for prohibiting at least the subsequent movement of content from said first recording medium to a second recording medium when the pieces of the verification information do not match.

11. The information recording and playback apparatus according to claim 10, wherein said verification information recording means outputs said verification information when the power supply is switched off at least only when the recording of content onto said first recording medium and the movement of content from said first recording medium to said second recording medium are performed from the previous switching-on of said information recording and playback apparatus until the power supply is switched off.

12. A content management method for use with an information recording and playback apparatus capable of recording information on a plurality of recording media and playing back recorded information, said content management method comprising:
outputting unique verification information and overwriting the unique verification information on a first recording medium and non-volatile information holding means at least each time content is recorded on said first recording medium and content recorded on said first recording medium is moved to a second recording medium; and
verifying said verification information recorded on said first recording medium against said verification information held by said information holding means at least when content recorded on said first recording medium is moved to said second recording medium and permitting the movement of the content when the pieces of the verification information match.

13. A content management method for use with an information recording and playback apparatus capable of recording information on a plurality of recording media and playing back recorded information, said content management method comprising:

outputting verification information associated with all the information recorded on a first recording medium and overwriting the verification information on non-volatile information holding means at least each time content is recorded on said first recording medium and content recorded on said first recording medium is moved to a second recording medium; and verifying the information recorded on said first recording medium against said verification information held by said information holding means at least when content recorded on said first recording medium is moved to said second recording medium and permitting the movement of the content when the correlation of the information is correctly authenticated.

14. A content management program product embodied in a computer readable medium storing a program for enabling a computer to perform a content management process when content is recorded on a plurality of recording media and recorded content can be played back, said content management program product comprising:

outputting unique verification information and overwriting the unique verification information on said first recording medium and non-volatile information holding means at least each time content is recorded on a first recording medium and content recorded on said first recording medium is moved to a second recording medium; and verifying said verification information recorded on said first recording medium against said verification information held by said information holding means at least when content recorded on said first recording medium is moved to said second recording medium and permitting the movement of the content when the pieces of the verification information match.

15. A content management program product embodied in a computer readable medium storing a program for enabling a computer to perform a content management process when content is recorded on a plurality of recording media and recorded content can be played back, said content management program product comprising:

outputting verification information associated with all the information recorded on a first recording medium and overwriting the verification information in non-volatile information holding means at least each time content is recorded on said first recording medium and content recorded on said first recording medium is moved to a second recording medium; and verifying information recorded on said first recording medium against said verification information held by said information holding means and permitting the movement of the associated content when the correlation of the information is correctly authenticated at least when content recorded on said first recording medium is moved to said second recording medium.

* * * * *